(12) United States Patent
Agiwal et al.

(10) Patent No.: US 12,477,609 B2
(45) Date of Patent: Nov. 18, 2025

(54) METHOD AND APPARATUS FOR ENHANCED RESUME PROTECTION

(71) Applicant: Samsung Electronics Co., Ltd., Gyeonggi-do (KR)

(72) Inventors: Anil Agiwal, Gyeonggi-do (KR); Soenghun Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 317 days.

(21) Appl. No.: 18/014,260

(22) PCT Filed: Aug. 3, 2021

(86) PCT No.: PCT/KR2021/010182
§ 371 (c)(1),
(2) Date: Jan. 3, 2023

(87) PCT Pub. No.: WO2022/030972
PCT Pub. Date: Feb. 10, 2022

(65) Prior Publication Data
US 2023/0262815 A1   Aug. 17, 2023

(30) Foreign Application Priority Data
Aug. 3, 2020   (KR) .................. 10-2020-0096916

(51) Int. Cl.
*H04W 76/19* (2018.01)
*H04W 72/1268* (2023.01)
(Continued)

(52) U.S. Cl.
CPC ....... *H04W 76/19* (2018.02); *H04W 72/1268* (2013.01); *H04W 74/0833* (2013.01);
(Continued)

(58) Field of Classification Search
CPC ............ H04W 76/19; H04W 72/1268; H04W 74/0841; H04W 74/0836; H04W 74/0838;
(Continued)

(56) References Cited

U.S. PATENT DOCUMENTS

| 2019/0150218 A1* | 5/2019 | Futaki ................. H04W 4/70 370/329 |
| 2020/0137564 A1 | 4/2020 | Liu et al. |
| 2021/0307100 A1* | 9/2021 | Talebi Fard .......... H04W 76/18 |

FOREIGN PATENT DOCUMENTS

WO   WO-2021146602 A1 *   7/2021   ............ H04W 76/10

OTHER PUBLICATIONS

PCT/ISA/210 Search Report issued on PCT/KR2021/010182, Nov. 4, 2021 pp. 3.
(Continued)

*Primary Examiner* — Thai Nguyen
(74) *Attorney, Agent, or Firm* — The Farrell Law Firm, P.C.

(57) ABSTRACT

A communication method and system for converging a $5^{th}$ generation (5G) communication system for supporting higher data rates beyond a $4^{th}$ generation (4G) system with a technology for Internet of things (IoT) are provided. The communication method and system includes intelligent services based on the 5G communication technology and the IoT-related technology, such as smart home, smart building, smart city, smart car, connected car, health care, digital education, smart retail, security and safety services. A method, a terminal, and a base station for small data transmission in a wireless communication system are provided.

15 Claims, 7 Drawing Sheets

(51) Int. Cl.
  *H04W 74/0833* (2024.01)
  *H04W 74/0836* (2024.01)
  *H04W 74/0838* (2024.01)

(52) U.S. Cl.
  CPC .... *H04W 74/0841* (2013.01); *H04W 74/0836* (2024.01); *H04W 74/0838* (2024.01)

(58) Field of Classification Search
  CPC . H04W 76/27; H04W 74/0833; H04W 12/04; H04W 28/0278; H04W 76/11; H04W 36/0061; H04W 74/002; Y02D 30/70
  See application file for complete search history.

(56) References Cited

OTHER PUBLICATIONS

PCT/ISA/237 Written Opinion issued on PCT/KR2021/010182, Nov. 4, 2021 pp. 5.

Qualcomm Incorporated, Samsung, CATT, Huawei, Hisilicon, "shortResumeMAC-I calculation", 3GPP TSG-SA WG3 Meeting #99e S3-201263 e-meeting, May 1, 2020, pp. 6.

3GPP TS 33.501 V16.3.0 (Jul. 10, 2020) 3rd Generation Partnership Project; Technical Specification Group Services and System Aspects; Security architecture and procedures for 5G system (Release 16), pp. 250.

European Search Report dated Mar. 26, 2024 issued in counterpart application No. 21854405.4-1215, 6 pages.

Samsung, "Overall Procedure for Data Transfer in Inactive State", R2-168051, 3GPP TSG-RAN WG2 Meeting #6, Nov. 14-18, 2016, 6 pages.

ZTE, "Consideration on Early Data Transmission in eFeMTC", R2-1708380, 3GPP TSG-RAN WG2 Meeting #99, Aug. 21-25, 2017, 11 pages.

Huawei, HiSilicon, "Data Transmission in Inactive State, Option A vs. Option B", R2-1702058, 3GPP TSG-RAN WG2 #97, Feb. 13-17, 2017, 5 pages.

Qualcomm Incorporated, "UL Early Data Transmission", R2-1708239, 3GPP TSG-RAN WG2 Meeting #99, Aug. 21-25, 2017, 13 pages.

European Search Report dated Oct. 4, 2023 issued in counterpart application No. 21854405.4-1215, 14 pages.

\* cited by examiner

METHOD AND APPARATUS FOR ENHANCED RESUME PROTECTION

PRIORITY

This application is a National Phase Entry of PCT International Application No. PCT/KR2021/010182 which was filed on Aug. 3, 2021, and claims priority to Korean Patent Application No. 10-2020-0096916, which was filed on Aug. 3, 2020, the entire content of each of which is incorporated herein by reference.

TECHNICAL FIELD

The disclosure relates to enhanced resume protection. More particularly, the disclosure relates to handling backward compatibility of connection resume protection and enhanced small data transmission procedure.

BACKGROUND ART

To meet the demand for wireless data traffic which has increased since deployment of 4th generation (4G) communication systems, efforts have been made to develop an improved 5th generation (5G) or pre-5G communication system. Therefore, the 5G or pre-5G communication system is also referred to as a 'beyond 4G network' or a 'post long-term evolution (LTE) System.' The 5G wireless communication system supports not only lower frequency bands, but also higher frequency (millimeter (mm) Wave) bands, e.g., 10 gigahertz (GHz) to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multipoints (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving into an internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth, have been recently researched. Such an IoT environment may provide intelligent Internet technology services that create new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. The third generation (3G) wireless communication system supports the voice service and data service. The 4G wireless communication system has been developed to provide high-speed data service. However, the 4G wireless communication system currently suffers from a lack of resources to meet the growing demand for high speed data services. Therefore, the 5G wireless communication system (also referred to as next generation radio or new radio (NR)) is being developed to meet the growing demand of various services with diverse requirements, e.g., high-speed data services, support ultra-reliability and low-latency applications.

In addition, the 5G wireless communication system is expected to address different use cases having different requirements in terms of data rate, latency, reliability, mobility, etc. However, it is expected that the design of the air-interface of the 5G wireless communication system will be flexible enough to serve user equipments (UEs) having different capabilities depending on the use case and market segment in which a UE caters service to the end customer. Use cases that the 5G wireless communication system is expected to address include enhanced Mobile Broadband (eMBB), massive machine type communication (m-MTC), ultra-reliable low-latency communication (URLL), etc. The eMBB requirements (e.g., tens of gigabits per second (Gbps) data rate, low-latency, high-mobility, and so on) address the market segment representing the wireless broadband subscribers needing internet connectivity everywhere, all the time, and on the go. The m-MTC requirements (e.g., very high connection density, infrequent data transmission, very long battery life, low mobility address, and so on) address the market segment representing the IoT/IoE envisioning connectivity of billions of devices. The URLL requirements (e.g., very low latency, very high reliability, variable mobility, and so forth) address the market segment representing the industrial automation application and vehicle-to-vehicle/vehicle-to-infrastructure communication that is foreseen as one of the enablers for autonomous cars.

The 5G wireless communication system supports a stand-alone mode of operation as well as dual connectivity (DC). In DC, a multiple receive (Rx)/transmit (Tx) UE may be configured to utilize resources provided by two different nodes (or node Bs (NBs)) connected via a non-ideal backhaul. One node acts as a master node (MN) and the other node acts as a secondary node (SN). The MN and SN are connected via a network interface and at least the MN is connected to the core network. NR also supports multi-radio access technology (RAT) DC (MR-DC) operation whereby a UE in radio resource control (RRC)_CONNECTED is configured to utilize radio resources provided by two distinct schedulers, located in two different nodes connected via a non-ideal backhaul and providing either evolved universal mobile telecommunications system (UMTS) terrestrial radio access (E-UTRA) (i.e., if the node is a new generation-evolved node B (ng-eNB)) or NR access (i.e., if the node is a next generation node B (gNB)).

In NR, for a UE in RRC_CONNECTED not configured with carrier aggregation (CA)/DC, there is only one serving cell, comprising the primary cell (PCell). For a UE in RRC_CONNECTED configured with CA/DC, the term 'serving cells' is used to denote the set of cells comprising the special cell(s) (SpCell(s)) and all secondary cells (SCells).

In NR, the term 'master cell group (MCG)' refers to a group of serving cells associated with the MN, comprising the PCell and optionally one or more SCells. In NR, the term 'secondary cell group (SCG)' refers to a group of serving cells associated with the SN, comprising the primary SCG cell (PSCell) and optionally one or more SCells. In NR, PCell refers to a serving cell in MCG, operating on the primary frequency, in which the UE either performs the initial connection establishment procedure or initiates the connection re-establishment procedure. In NR, for a UE configured with CA, an Scell is a cell providing additional radio resources on top of an SpCell. PSCell refers to a serving cell in SCG in which the UE performs random access (RA) when performing the reconfiguration with synchronization procedure. For DC operation, the term 'SpCell' refers to the PCell of the MCG or the PSCell of the SCG; otherwise, the term 'SpCell' refers to the PCell.

In the 5G wireless communication system, physical downlink (DL) control channel (PDCCH) is used to schedule DL transmissions on physical DL shared channel (PDSCH) and uplink (UL) transmissions on PUSCH, where the DL control information (DCI) on PDCCH includes: DL assignments containing at least modulation and coding format, resource allocation, and hybrid-automatic repeat request (HARQ) information related to DL-SCH; or UL scheduling grants containing at least modulation and coding format, resource allocation, and HARQ information related to UL-SCH. In addition to scheduling, PDCCH can be used to for: activation and deactivation of configured PUSCH transmission with configured grant; Activation and deactivation of PDSCH semi-persistent transmission; notifying one or more UEs of the slot format; notifying one or more UEs of the physical resource block(s) (PRB(s)) and orthogonal frequency division multiplexing (OFDM) symbol(s) where the UE may assume no transmission is intended for the UE; transmission of TX power control (TPC) commands for physical UL control channel (PUCCH) and PUSCH; transmission of one or more TPC commands for semi-persistent scheduling (SRS) transmissions by one or more UEs; switching a UE's active bandwidth part (BWP); or initiating an RA procedure. A UE monitors a set of PDCCH candidates in the configured monitoring occasions in one or more configured control resource sets (CORESETs) according to the corresponding search space configurations. A CORESET consists of a set of PRBs with time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and noninterleaved CCE-to-REG mapping are supported in a CORESET. Polar coding is used for PDCCH. Each REG carrying PDCCH carries its own demodulation reference signal (DMRS). Quadrature phase shift keying (QPSK) modulation is used for PDCCH.

In the 5G wireless communication system, a list of search space configurations is signaled by a gNB for each configured BWP, wherein each search configuration is uniquely identified by an identifier (ID). An ID of a search space configuration to be used for specific purpose such as paging reception, system information (SI) reception, and RA response reception is explicitly signaled by the gNB. In NR, a search space configuration comprises parameters Monitoring-periodicity-PDCCH-slot, Monitoring-offset-PDCCH-slot, Monitoring-symbols-PDCCH-within-slot, and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration, where the slot with number 'x' in a radio frame with number 'y' satisfies the following equation.

$$(y*(\text{number of slots in a radio frame})+x-\text{Monitoring-offset-PDCCH-slot})\bmod (\text{Monitoring-periodicity-PDCCH-slot})=0$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the CORESET associated with the search space. Search space configuration includes the ID of CORESET configuration associated with it. A list of CORESET configurations is signaled by a gNB for each configured BWP, wherein each CORESET configuration is uniquely identified by an ID. Note that each radio frame is of 10 ms duration. A radio frame is identified by a radio frame number or system frame number. Each radio frame comprises several slots, wherein the number of slots in a radio frame and duration of slots depend on subcarrier spacing (SCS). The number of slots in a radio frame and duration of slots depending on radio frame for each supported SCS are pre-defined in NR. Each CORESET configuration is associated with a list of transmission configuration indicator (TCI) states. One DL reference signal (RS) ID (synchronization signal and physical broadcast block (SSB) or channel state information (CSI)-RS) is configured per TCI state. The list of TCI states corresponding to a CORESET configuration is signaled by a gNB via RRC signaling. One of the TCI states in a TCI state list is activated and indicated to the UE by the gNB. The TCI state indicates the DL TX beam (DL TX beam is quasi co-located (QCLed) with SSB/CSI-RS of TCI state) used by the gNB for transmission of PDCCH in the PDCCH monitoring occasions of a search space.

In the 5G wireless communication system, bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the SCS can be ordered to change (e.g., to allow different services). A subset of the total cell bandwidth of a cell is referred to as a BWP. BA is achieved by configuring an RRC connected UE with BWP(s) and informing the UE of which of the configured BWPs is currently the active one. When BA is configured, the UE only has to monitor PDCCH on the one active BWP, i.e., it does not have to monitor PDCCH on the entire DL frequency of the serving cell. In an RRC connected state, the UE is configured with one or more DL and UL BWPs, for each configured serving cell (i.e., PCell or SCell). For an activated serving cell, there is always one active UL and DL BWP at any point in time. The BWP switching for a serving cell is used to activate an inactive BWP and deactivate an active BWP at a time. The BWP switching is controlled by the PDCCH indicating a DL assignment or a UL grant, by the bwp-InactivityTimer, by RRC signaling, or by the media access control (MAC) entity itself upon initiation of RA procedure. Upon addition of SpCell or activation of an SCell, the DL BWP and UL BWP indicated by firstActiveDownlinkBWP-Id and firstActiveUplinkBWP-Id respectively are active without receiving PDCCH indicating a DL assignment or a UL grant. The active BWP for a serving cell is indicated by either RRC or PDCCH. For unpaired spectrum, a DL BWP is paired with a UL BWP, and BWP switching is common for both UL and DL. Upon expiry of BWP inactivity timer, UE switches the active DL BWP to the default DL BWP or initial DL BWP (if default DL BWP is not configured).

In the 5G wireless communication system, RA is supported. RA is used to achieve UL time synchronization. RA is used during initial access, handover, RRC connection re-establishment procedures, scheduling request transmission, SCG addition/modification, beam failure recovery (BFR), and data or control information transmission in UL by a non-synchronized UE in an RRC CONNECTED state. Several types of RA procedures are supported.

Contention Based RA (CBRA)

This is also referred to as 4-step CBRA. In this type of RA, the UE first transmits an RA preamble (also referred to as message 1 (Msg1)), and then waits for a random access response (RAR) in the RAR window. The RAR is also referred to as message 2 (Msg2). Next generation node B (gNB) transmits the RAR on the physical downlink shared channel (PDSCH). A PDCCH scheduling the PDSCH carrying the RAR is addressed to an RA-radio network temporary identifier (RA-RNTI). The RA-RNTI identifies the time-frequency resource (also referred to as a physical RA channel (PRACH) occasion or a PRACH transmission (TX) occasion or an RA channel (RACH) occasion) in which the RA preamble was detected by the gNB. The RA-RNTI is calculated as follows:

$$RA\text{-}RNTI = 1 + s\_id + 14 * t\_id + 14 * 80 * f\_id + 14 * 80 * 8 * ul\_carrier\_id$$

where $s\_id$ is the index of the first orthogonal frequency division multiplexing (OFDM) symbol of the PRACH occasion, where the UE has transmitted Msg1, i.e., the RA preamble; $0 \leq s\_id < 14$; $t\_id$ is the index of the first slot of the PRACH occasion ($0 \leq t\_id < 80$); $f\_id$ is the index of the PRACH occasion within the slot in the frequency domain ($0 \leq f\_id < 8$); and $ul\_carrier\_id$ is the UL carrier used for Msg1 transmission (0 for normal UL (NUL) carrier and 1 for supplementary UL (SUL) carrier. Several RARs for various RA preambles detected by the gNB can be multiplexed in the same RAR media access control (MAC) protocol data unit (PDU) by the gNB. An RAR in a MAC PDU corresponds to a UE's RA preamble transmission if the RAR includes an RA preamble identifier (RAPID) of the RA preamble transmitted by the UE. If the RAR corresponding to its RA preamble transmission is not received during the RAR window and the UE has not yet transmitted the RA preamble for a configurable (e.g., configured by the gNB in a RACH configuration) number of times, the UE returns to the first step, i.e., selects an RA resource (preamble/PRACH occasion) and transmits the RA preamble. A backoff may be applied before returning to the first step.

If the RAR corresponding to the RA preamble transmission is received, the UE transmits a message 3 (Msg3) in a UL grant received in RAR. Msg3 includes a message such as an RRC connection request, an RRC connection re-establishment request, an RRC handover confirm, a scheduling request, an SI request, etc. Msg3 may include the UE identity (i.e., a cell-radio network temporary identifier (C-RNTI), a system architecture evolution (SAE)-temporary mobile subscriber identity (S-TMSI), or a random number). After transmitting the Msg3, the UE starts a contention resolution timer. While the contention resolution timer is running, if the UE receives a PDCCH addressed to the C-RNTI included in Msg3, contention resolution is considered successful, a contention resolution timer is stopped, and the RA procedure is completed. While the contention resolution timer is running, if the UE receives a contention resolution MAC control element (CE) including the UE's contention resolution identity (e.g., the first X bits of a common control channel (CCCH) service data unit (SDU) transmitted in Msg3), contention resolution is considered successful, the contention resolution timer is stopped, and the RA procedure is completed. If the contention resolution timer expires and the UE has not yet transmitted the RA preamble for a configurable number of times, the UE returns to the first step, i.e., selects an RA resource (preamble/PRACH occasion) and transmits the RA preamble. A backoff may be applied before returning to the first step.

Contention Free RA (CFRA)

This is also referred to as legacy CFRA or 4-step CFRA. A CFRA procedure is used for scenarios such as handover where low latency is required, timing advance establishment for SCell, etc. An eNB (or gNB) assigns to the UE a dedicated RA preamble. The UE transmits the dedicated RA preamble. The eNB (or gNB) transmits the RAR on a PDSCH addressed to RA-RNTI. The RAR conveys an RA preamble identifier and timing alignment information. The RAR may also include a UL grant. The RAR is transmitted in an RAR window similar to a CBRA procedure. CFRA is considered successfully completed after receiving the RAR including an RAPID of the RA preamble transmitted by the UE. In case RA is initiated for BFR, CFRA is considered successfully completed if PDCCH addressed to C-RNTI is received in a search space for BFR. If the RAR window expires and RA is not successfully completed and the UE has not yet transmitted the RA preamble for a configurable (i.e., configured by the gNB in a RACH configuration) number of times, the UE retransmits the RA preamble.

For certain events such as handover and BFR, if dedicated preamble(s) are assigned to the UE, during the first step of RA procedure, i.e., during RA resource selection for Msg1 transmission, the UE determines whether to transmit the dedicated preamble or a non-dedicated preamble. Dedicated preambles are typically provided for a subset of SSBs/channel state information reference signals (CSI-RSs). If there is no SSB/CSI-RS having DL reference signal received power (RSRP) above a threshold among the SSBs/CSI-RSs for which CFRA resources (i.e., dedicated preambles/PRACH occasions) are provided by the gNB, the UE selects a non-dedicated preamble. Otherwise, the UE selects the dedicated preamble. During the RA procedure, one RA attempt may be CFRA while another RA attempt may be CBRA.

2-Step CBRA

In the first step of 2-step CBRA, the UE transmits an RA preamble on a PRACH and a payload (i.e., MAC PDU) on a PUSCH. The RA preamble and payload transmission is also referred to as message A (MSGA). In the second step, after MSGA transmission, the UE monitors for a response from the network (i.e., from the gNB) within a configured window. The response is also referred to as message B (MSGB). If a CCCH SDU was transmitted in the MsgA payload, the UE performs contention resolution using the contention resolution information in MSGB. The contention resolution is successful if the contention resolution identity received in MSGB matches the first 48 bits of the CCCH SDU transmitted in MSGA. If a C-RNTI was transmitted in the MSGA payload, the contention resolution is successful if the UE receives a PDCCH addressed to the C-RNTI. If contention resolution is successful, the RA procedure is considered successfully completed. Instead of contention resolution information corresponding to the transmitted MSGA, MSGB may include fallback information corresponding to the RA preamble transmitted in MSGA. If the fallback information is received, the UE transmits Msg3 and performs contention resolution using Msg4 as in the CBRA procedure. If contention resolution is successful, the RA procedure is considered successfully completed. If contention resolution fails upon fallback (i.e., upon transmitting Msg3), the UE retransmits MSGA. If a configured window in which the UE monitors a network response after transmitting MSGA expires and the UE has not received MSGB including contention resolution information or fallback information as explained above, the UE retransmits MSGA. If the RA procedure is not successfully completed after transmitting MSGA a configurable number of times, the UE fallbacks to the 4-step RA procedure, i.e., the UE only transmits the RA preamble.

An MSGA payload may include one or more of CCCH SDU, a dedicated control channel (DCCH) SDU, a dedicated traffic channel (DTCH) SDU, a buffer status report (BSR) MAC CE, a power headroom report (PHR) MAC CE, SSB information, a C-RNTI MAC CE, or padding. MSGA may include a UE ID (e.g., random ID, S-TMSI, C-RNTI, resume ID, etc.) along with a preamble in the first step. The UE ID may be included in the MAC PDU of MSGA. A UE ID such as C-RNTI may be carried in a MAC CE, wherein the MAC CE is included in a MAC PDU. Other UE IDs (such as random ID, S-TMSI, C-RNTI, resume ID, etc.) may be carried in CCCH SDU. The UE ID can be one of a random ID, S-TMSI, C-RNTI, resume ID, international mobile subscriber identity (IMSI), idle mode ID, inactive mode ID, etc. The UE ID can be different in different scenarios in which the UE performs the RA procedure. When the UE performs RA after power on (e.g., before it is attached to the network), then the UE ID is the random ID. When the UE performs RA in an IDLE state after the UE is attached to network, the UE ID is S-TMSI. If the UE has an assigned C-RNTI (e.g., in a connected state), the UE ID is C-RNTI. In case the UE is in an INACTIVE state, the UE ID is a resume ID. In addition to the UE ID, some additional control information can be sent in MSGA. The control information may be included in the MAC PDU of the MSGA. The control information may include one or more of a connection request indication, a connection resume request indication, an SI request indication, a buffer status indication, beam information (e.g., one or more DL TX beam ID(s) or SSB ID(s)), BFR indication/information, a data indicator, a cell/base station (BS)/transmit-receive point (TRP) switching indication, a connection re-establishment indication, a reconfiguration complete or handover complete message, etc.

2-Step CFRA

In this case, the gNB assigns to the UE a dedicated RA preamble(s) and physical uplink shared channel (PUSCH) resource(s) for MSGA transmission. PRACH occasion(s) to be used for preamble transmission may also be indicated. In the first step of 2-step CFRA, the UE transmits the RA preamble on a PRACH and a payload on a PUSCH using the CFRA resources (i.e., a dedicated preamble/PUSCH resource/PRACH occasion). In the second step of 2-step CFRA, after MsgA transmission, the UE monitors for a response from the network (i.e., the gNB) within a configured window. If the UE receives a PDCCH addressed to the C-RNTI, the RA procedure is considered successfully completed. If the UE receives fallback information corresponding to the transmitted preamble, the RA procedure is considered successfully completed.

For certain events such as handover and BFR, if a dedicated preamble(s) and PUSCH resource(s) are assigned to the UE, during the first step of RA procedure, i.e., during RA resource selection for MSGA transmission, the UE determines whether to transmit the dedicated preamble or a non-dedicated preamble. Dedicated preambles are typically provided for a subset of SSBs/CSI-RSs. If there is no SSB/CSI-RS having a DL RSRP above a threshold among the SSBs/CSI-RSs for which CFRA resources (i.e., dedicated preambles/PRACH occasions/PUSCH resources) are provided by the gNB, the UE selects a non-dedicated preamble. Otherwise, the UE selects the dedicated preamble. During the RA procedure, one RA attempt may be 2-step CFRA, while another RA attempt may be 2-step CBRA.

Upon initiation of an RA procedure, the UE first selects the carrier (i.e., an SUL or NUL). If the carrier to use for the RA procedure is explicitly signaled by the gNB, the UE selects the signaled carrier for performing the RA procedure. If the carrier to use for the RA procedure is not explicitly signaled by the gNB; and if the serving cell for the RA procedure is configured with the SUL; and if the RSRP of the DL pathloss reference is less than rsrp-ThresholdSSB-SUL: then the UE selects the SUL carrier for performing RA procedure. Otherwise, the UE selects the NUL carrier for performing the RA procedure. Upon selecting the UL carrier, the UE determines the UL and DL BWP for RA procedure as specified in section 5.15 of technical specification (TS) 38.321. The UE then determines whether to perform 2-step or 4-step RA for this RA procedure.

If this RA procedure is initiated by a PDCCH order and if the ra-PreambleIndex explicitly provided by PDCCH is not 0b000000, the UE selects 4-step RA procedure.

Else if 2-step CFRA resources are signaled by the gNB for this RA procedure, the UE selects 2-step RA procedure.

Else if 4-step CFRA resources are signaled by the gNB for this RA procedure, the UE selects 4-step RA procedure.

Else if the UL BWP selected for this RA procedure is configured with only 2-step RA resources, the UE selects 2-step RA procedure.

Else if the UL BWP selected for this RA procedure is configured with only 4-step RA resources, the UE selects 4-step RA procedure.

Else if the UL BWP selected for this RA procedure is configured with both 2-step and 4-step RA resources and RSRP of the DL pathloss reference is below a configured threshold, the UE selects 4-step RA procedure. Otherwise, the UE selects 2-step RA procedure.

In the 5G wireless communication system, the UE can be in one of the following RRC states: RRC_IDLE, RRC_INACTIVE, and RRC_CONNECTED. A UE is either in RRC_CONNECTED state or in RRC_INACTIVE state when an RRC connection has been established. If this is not the case, i.e., no RRC connection is established, the UE is in RRC_IDLE state. The RRC states can further be characterized as follows:

In RRC_IDLE state, a UE specific discontinuous reception (DRX) may be configured by upper layers (i.e., non-access stratum (NAS)). The UE monitors short messages transmitted with paging-radio network temporary identity (P-RNTI) over downlink control information (DCI), monitors a paging channel for core network (CN) paging using 5G-system architecture evolution (SAE)-temporary mobile subscriber identity (5G-S-TMSI), performs neighboring cell measurements and cell selection or re-selection, acquires SI, can send SI request (if configured), and performs logging of available measurements together with location and time for logged measurement configured UEs.

In RRC_INACTIVE state, a UE specific DRX may be configured by upper layers or by RRC layer. In this state, the UE stores the UE inactive access stratum (AS) context. A radio access network (RAN)-based notification area is configured by RRC layer. The UE monitors short messages transmitted with P-RNTI over DCI, monitors a paging channel for CN paging using 5G-S-TMSI and RAN paging using full inactive-RNTI (I-RNTI), performs neighboring cell measurements and cell selection or re-selection, performs RAN-based notification area updates periodically and when moving outside the configured RAN-based notification area, acquires SI, can send SI request (if configured), and performs logging of available measurements together with location and time for logged measurement configured UEs.

In the RRC_CONNECTED state, the UE stores the AS context. Unicast data is transmitted/received to/from the UE. The UE monitors short messages transmitted with P-RNTI over DCI, if configured, monitors control channels associated with the shared data channel to determine if data is scheduled for it, provides channel quality and feedback information, performs neighboring cell measurements and measurement reporting, and acquires SI.

In the RRC_CONNECTED state, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RAN notification area (RNA) update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes signaling radio bearer(s) (SRB(s)) and data radio bearer(s) DRB(s). In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

Upon initiating the resume procedure, UE may: apply the default layer 1 (L1) parameter values as specified in corresponding physical layer specifications, except for the parameters for which values are provided in SIB1; apply the default MAC Cell Group configuration; apply the CCCH configuration; start timer T319; apply the timeAlignmentTimerCommon included in SIB1; apply the default SRB1 configuration; set the variable pendingRNA-Update to false; initiate transmission of the RRCResumeRequest message or RRCResumeRequest1; restore the RRC configuration, robust header compression (RoHC) state, the stored quality of service (QoS) flow to DRB mapping rules and the $K_{gNB}$ and $K_{RRCint}$ keys from the stored UE Inactive AS context except for the following: masterCellGroup; mrdc-SecondaryCellGroup, if stored; and pdcp-Config; set the resume-MAC-I to the 16 least significant bits of the MAC-I calculated: with the $K_{RRCint}$ key in the UE Inactive AS Context and the previously configured integrity protection algorithm; and with all input bits for COUNT, BEARER and DIRECTION set to binary ones; derive the $K_{gNB}$ key based on the current $K_{gNB}$ key or the next hop (NH), using the stored nextHopChainingCount value; derive the $K_{RRCenc}$ key, the $K_{RRCint}$ key, the $K_{UPint}$ key and the $K_{UPenc}$ key; configure lower layers to apply integrity protection for all signaling radio bearers except SRB0 using the configured algorithm and the $K_{RRCint}$ key and $K_{UPint}$ key, i.e., integrity protection shall be applied to all subsequent messages received and sent by the UE; configure lower layers to apply ciphering for all signaling radio bearers except SRB0 and to apply the configured ciphering algorithm, the $K_{RRCenc}$ key and the $K_{UPenc}$ key, i.e., the ciphering configuration shall be applied to all subsequent messages received and sent by the UE; re-establish packet data convergence protocol (PDCP) entities for SRB1; resume SRB1; and transmit RRCResumeRequest or RRCResumeRequest1.

Other aspects, advantages, and salient features of the disclosure will become apparent to those skilled in the art from the following detailed description, which, taken in conjunction with the annexed drawings, discloses various embodiments of the disclosure.

DISCLOSURE OF INVENTION

Technical Problem

Issue 1:

During the radio resource control (RRC) connection resume procedure or small data transmission procedure (or RRC connection resume procedure initiated for small data transmission), ResumeMAC-I is generated according to current design using following inputs:

KEY ($K_{RRCint}$), BEARER (set to 1), DIRECTION (set to 1), and COUNT (set to 1); and MESSAGE: source physical cell identity (PCI) (set to the physical cell identity of the primary cell (PCell) the user equipment (UE) was connected to prior to suspension of the RRC connection); target Cell-ID (set to the cellIdentity of the first public land mobile network (PLMN)-Identity included in the PLMN-IdentityInfoList broadcasted in system information block 1 (SIB1) of cell to which UE is sending resume request); and source cell-radio network temporary identifier (C-RNTI) (set to C-RNTI that the UE had in the PCell it was connected to prior to suspension of the RRC connection).

To further enhance security of resume request, inclusion of resumeCause in generation of resumeMAC-I is being considered. The issue is how to handle backward compatibility:

Current Resume Operation: UE is in RRC CONNECTED with next generation node B1 (gNB1); UE receives RRCRelease with suspend configuration from gNB1. UE enters RRC INACTIVE and stores the current access stratum (AS) Context. When the criteria to resume RRC connection are met, UE initiates RRC connection resumption. UE generates resumeMAC-I using inputs (explained earlier) and sends RRCResume to gNB2. RRCResume includes ResumeCause, resumeMAC-I, inactive-RNTI (I-RNTI), and spare bit. gNB2 identifies gNB1 from I-RNTI and sends context request to gNB1. Context request includes UE's I-RNTI, target Cell ID, ResumeMAC-I, to old gNB. gNB1 verifies ResumeMAC-I and sends UE's context to gNB2.

If gNB2 does not understand enhanced ResumeMAC-I operation, it will not send resumeCause to gNB1. So resumeMAC-I verification fails.

If gNB2 understands but gNB1 does not understand enhanced ResumeMAC-I operation, gNB1 may fail to understand context request including resumeCause value. So resumeMAC-I verification fails.

So method to handle backward compatibility is needed.
Issue 2:

In the fifth generation (5G) wireless communication system, small data transmission (SDT) in RRC_INACTIVE is supported. The uplink data can be transmitted in message 3 (Msg3) in case of 4-step random access (RA) procedure and in message A (MSGA) in case of 2-step RA procedure. In the current method of small data transmission, uplink data is transmitted in Msg3. This requires configuration of different random access channel (RACH) preambles and/or RACH occasions for small data transmissions. The uplink transmission is also not contention free which leads to waste of physical uplink shared channel (PUSCH) resources in case of collision. So enhanced method is needed.

Solution to Problem

Aspects of the disclosure are to address at least the above-mentioned problems and/or disadvantages and to provide at least the advantages described below. Accordingly, an aspect of the disclosure is to provide a communication method and system for converging a 5th generation (5G) communication system for supporting higher data rates beyond a 4th generation (4G) system.

In accordance with an aspect of the disclosure, a method performed by a terminal for small data transmission in a wireless communication system is provided. The method includes transmitting, to a base station, a random access preamble, receiving, from the base station, a random access response corresponding to the random access preamble, the random access response including an uplink grant for message 3 (Msg3) transmission, transmitting, to the base station, a Msg3 including a resume identity, a resume message authentication code for integrity (MAC-I) and information on uplink data size based on the uplink grant for Msg3 transmission, in case that the resume MAC-I is validated, receiving, from the base station, a message 4 (Msg4) including a contention resolution identity, wherein an uplink grant for uplink data transmission is received in the Msg4 or on a physical downlink control channel addressed to a cell-radio network temporary identifier (C-RNTI) received in the random access response after the Msg4, and transmitting, to the base station, uplink data based on the uplink grant for uplink data transmission.

In accordance with another aspect of the disclosure, a method performed by a base station for small data transmission in a wireless communication system. The method includes receiving, from a terminal, a random access preamble, transmitting, to the terminal, a random access response corresponding to the random access preamble, the random access response including an uplink grant for message 3 (Msg3) transmission, receiving, from the terminal, a Msg3 including a resume identity, a resume message authentication code for integrity (MAC-I) and information on uplink data size based on the uplink grant for Msg3 transmission, validating the resume MAC-I, in case that the resume MAC-I is validated, transmitting, to the terminal, a message 4 (Msg4) including a contention resolution identity, wherein an uplink grant for uplink data transmission is transmitted in the Msg4 or on a physical downlink control channel addressed to a cell-radio network temporary identifier (C-RNTI) transmitted in the random access response after the Msg4, receiving, from the terminal, uplink data based on the uplink grant for uplink data transmission, and transmitting, to a user plane function (UPF), the uplink data.

In accordance with another aspect of the disclosure, a terminal in a wireless communication system is provided. The terminal includes a transceiver and at least one processor coupled with the transceiver. The at least one processor is configured to transmit, to a base station via the transceiver, a random access preamble, receive, from the base station via the transceiver, a random access response corresponding to the random access preamble, the random access response including an uplink grant for message 3 (Msg3) transmission, transmit, to the base station via the transceiver, a Msg3 including a resume identity, a resume message authentication code for integrity (MAC-I) and information on uplink data size based on the uplink grant for Msg3 transmission, in case that the resume MAC-I is validated, receive, from the base station via the transceiver, a message 4 (Msg4) including a contention resolution identity, wherein an uplink grant for uplink data transmission is received in the Msg4 or on a physical downlink control channel addressed to a cell-radio network temporary identifier (C-RNTI) received in the random access response after the Msg4, and transmit, to the base station via the transceiver, uplink data based on the uplink grant for uplink data transmission.

In accordance with another aspect of the disclosure, a base station in a wireless communication system is provided. The base station includes a transceiver, and at least one processor coupled with the transceiver. The at least one processor is configured to receive, from a terminal via the transceiver, a random access preamble, transmit, to the terminal via the transceiver, a random access response corresponding to the random access preamble, the random access response including an uplink grant for message 3 (Msg3) transmission, receive, from the terminal via the transceiver, a Msg3 including a resume identity, a resume message authentication code for integrity (MAC-I) and information on uplink data size based on the uplink grant for Msg3 transmission, validate the resume MAC-I, in case that the resume MAC-I is validated, transmit, to the terminal via the transceiver, a message 4 (Msg4) including a contention resolution identity, wherein an uplink grant for uplink data transmission is transmitted in the Msg4 or on a physical downlink control channel addressed to a cell-radio network temporary identifier (C-RNTI) transmitted in the random access response after the Msg4, receive, from the terminal via the transceiver, uplink data based on the uplink grant for uplink data transmission, and transmit, to a user plane function (UPF) via the transceiver, the uplink data.

Advantageous Effects of Invention

The embodiments in the disclosure address the backward compatibility issue for resume protection. The embodiments also disclose enhanced methods of small data transmission which require less resources.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR THE INVENTION

Figure 1:
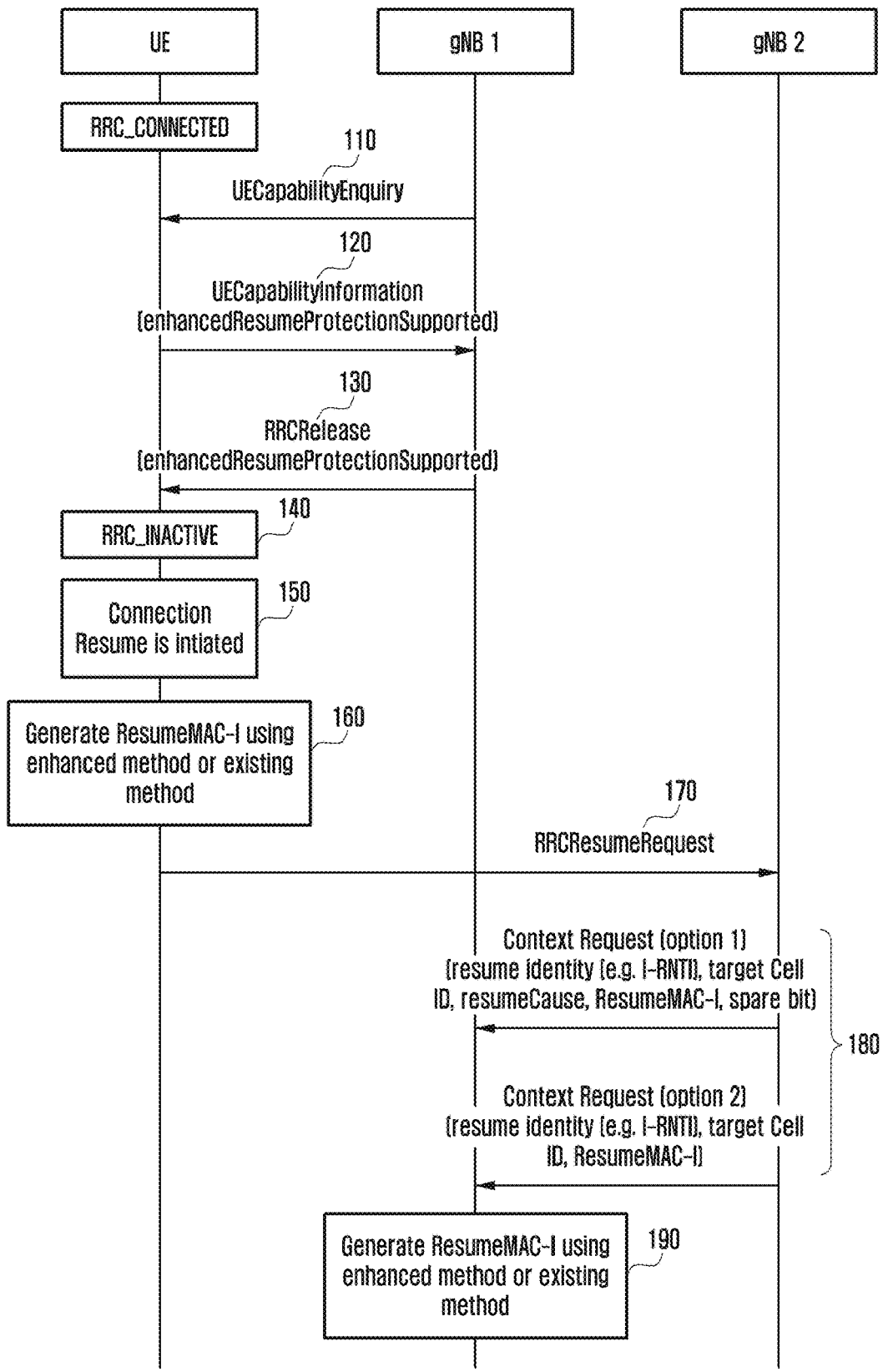
FIG. 1 illustrates an operation for enhanced protection for connection resume according to an embodiment based on Method 1 of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect that the characteristic was intended to provide.

It is known to those skilled in the art that blocks of a flowchart (or sequence diagram) and a combination of flowcharts may be represented and executed by non-transitory computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module," or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to providing the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

Handling backward compatibility of connection resume protection

Method 1

Embodiment 1

FIG. 1 illustrates an operation for enhanced protection for connection resume (i.e., RRCResumeRequest/RRCResumeRequest1 message) according to an embodiment based on Method 1 of the disclosure.

Referring to FIG. 1, in RRC_CONNECTED, UE receives UECapabilityEnquiry message from gNB/eNB at operation 110.

In response to the UECapabilityEnquiry message, the UE transmits a UECapabilityInformation message to the gNB/eNB at operation 120. If UE supports enhanced resume protection, it indicates to gNB/eNB that its supports enhanced resume protection, i.e., UE includes enhancedResumeProtectionSupported in UECapabilityInformation message. Otherwise, enhancedResumeProtectionSupported is not included in UECapabilityInformation message. UECapabilityInformation message is sent to gNB/eNB by UE. In an alternate embodiment, if UE supports enhanced resume protection, it can indicate to gNB/eNB that its supports enhanced resume protection, by including enhancedResumeProtectionSupported in another messages such as UEAssistanceInformation message or any other radio resource control (RRC) message or in non-access stratum (NAS) message.

At some point in time, gNB/eNB sends RRCRelease message with suspendConfig to release the ongoing RRC Connection at operation 130. If UE supports enhanced resume protection and gNB/eNB also supports enhanced resume protection, gNB includes parameter enhancedResumeProtectionEnabled (can also be referred to as enhancedResumeProtectionSupported or it can be any other parameter which indicates that enhanced resume protection is enabled/supported by gNB/eNB) in RRCRelease message to indicate that enhanced resume protection is enabled/supported by gNB/eNB. enhancedResumeProtectionEnabled can be added to suspendConfig information element (IE). In an alternate embodiment, gNB can indicate that it supports enhanced resume protection by including enhancedResumeProtectionEnabled (can also be referred to as enhancedResumeProtectionSupported or it can be any other parameter which indicates that enhanced resume protection is enabled/supported by gNB/eNB) in system information (e.g., in some system information block (SIB)). In an alternate embodiment, gNB can indicate that it supports enhanced resume protection by including enhancedResumeProtectionEnabled in any other RRC message or in NAS message.

Upon receiving RRCRelease message with suspendConfig, UE enters RRC_INACTIVE at operation 140.

While UE is in RRC_INACTIVE, if criteria (e.g., UE receives paging, or UE has mobile originated (MO) data to transmit, or UE receives paging message or radio access network (RAN) update/Location update is triggered, etc.) to resume RRC connection are met (or criteria to perform small data transmission procedure are met), UE initiates RRC connection resumption (or RRC connection resumption for small data transmission) at operation 150.

If UE supports enhanced resume protection and gNB where UE was last connected supports enhanced resume protection (e.g., enhancedResumeProtectionEnabled was received in RRCRelease suspending the last RRC connection or enhancedResumeProtectionEnabled was received (either in system information (SI) or RRC message or NAS message) from gNB where UE was last connected): UE generates ResumeMAC-I using enhanced method for resume protection (operation 2 below) operation 160. Else: UE generates ResumeMAC-I using current method (operation 1 below) at operation 160.

UE sends the RRCResumeRequest with ResumeMAC-I to gNB/eNB at operation 170.

If the gNB/eNB to which UE has sent resume request is different than the gNB/eNB which has UE's context: the new gNB/eNB to which the UE has sent the resume request sends a context request to the old gNB/eNB which has the UE's context at operation 180. In FIG. 1, gNB 1 corresponds to the old gNB/eNB which has the UE's context, and gNB 2 corresponds to the new gNB/eNB to which the UE has sent the resume request.

If the new gNB/eNB supports enhanced resume protection, the new gNB/eNB sends a UE's resume identity (e.g., inactive-radio network temporary identifier (I-RNTI)), a target Cell ID, a resumeCause, a ResumeMAC-I, and a spare bit to the old gNB/eNB. UE's resume identity (e.g., I-RNTI), a target Cell ID, a resumeCause, a ResumeMAC-I, and a spare bit are received by new gNB/eNB from the UE in RRCResumeRequest message. The new gNB/eNB identifies the old gNB/eNB using the resume identity and sends the context request to the old gNB/eNB with the above information.

Alternately, if the new gNB/eNB supports enhanced resume protection and UE has generated resumeMAC-I using enhanced resume protection (new gNB can identify that UE has generated resumeMAC-I using enhanced resume protection based on indication in ResumeRequest message or logical channel ID (LCID) used for ResumeRequest, different LCID can be used in case of enhanced resume protection, LCID is carried in media access control (MAC) subheader of MAC protocol data unit (PDU) carrying ResumeRequest): new gNB/eNB sends UE's resume identity (e.g., I-RNTI), target Cell ID, resumeCause, ResumeMAC-I, and spare bit to old gNB/eNB. UE's resume identity (e.g., I-RNTI), a target Cell ID, a resumeCause, a ResumeMAC-I, and a spare bit are received by new gNB/eNB from the UE in RRCResumeRequest message. The new gNB/eNB identifies the old gNB/eNB using resume identity and sends context request to it with the above information.

Else: new gNB/eNB sends only UE's resume identity (e.g., I-RNTI), target Cell ID, and ResumeMAC-I, to old gNB/eNB. The new gNB/eNB identifies the old gNB/eNB using resume identity and sends context request to it with the above information.

1> If as per UE's stored AS context, enhanced resume protection is supported by UE and enhanced resume protection is also supported old gNB/eNB: the old gNB/eNB identifies whether a resume cause and a spare bit are received from the new gNB/eNB.

2> If resume cause and spare bit are received from new gNB/eNB: old gNB/eNB generates ResumeMAC-I using KEY, BEARER, DIRECTION, COUNT, and MESSAGE (source PCI, target Cell-ID, source cell-RNTI (C-RNTI), resumeCause, spare bit) at operation 190.

2> Else old gNB/eNB generates ResumeMAC-I using KEY, BEARER, DIRECTION, COUNT, and MESSAGE (source PCI, target Cell-ID, source C-RNTI, resumeCause, spare bit) at operation 190. This is performed for each resumeCause and spare bit value until ResumeMAC-I is verified. Various ResumeCauses are predefined.

Alternately, ResumeMAC-I verification is considered failed and RRCReject is sent by new gNB to UE.
1> Else:
2> old gNB/eNB generates ResumeMAC-I using KEY, BEARER, DIRECTION, COUNT, and MESSAGE (source PCI, target Cell-ID, source C-RNTI) at operation 190.

If the gNB/eNB to which UE has send resume request is same as the gNB/eNB which has UE's context:
1> If as per UE's stored AS context, enhanced resume protection is supported by UE and enhanced resume protection is also supported by gNB/eNB:
2> gNB/eNB generates ResumeMAC-I using KEY, BEARER, DIRECTION, COUNT, and MESSAGE (source PCI, target Cell-ID, source C-RNTI, resumeCause, spare bit).
1> Else:
2> gNB/eNB generates ResumeMAC-I using KEY, BEARER, DIRECTION, COUNT, and MESSAGE (source PCI, target Cell-ID, source C-RNTI).

Embodiment 2

In another embodiment of this method of this disclosure, the operation for enhanced protection for connection resume (i.e., RRCResumeRequest/RRCResumeRequest1 message) is as follows:

UE is in RRC_CONNECTED.

UE receives UECapabilityEnquiry message from gNB/eNB.

If UE supports enhanced resume protection, it indicates to gNB/eNB that its supports enhanced resume protection, i.e., UE includes enhancedResumeProtectionSupported in UECapabilityInformation message. Otherwise, enhancedResumeProtectionSupported is not included in UECapabilityInformation message. UECapabilityInformation message is sent to gNB/eNB by UE. In an alternate embodiment, if UE supports enhanced resume protection, it can indicate to gNB/eNB that its supports enhanced resume protection, by including enhancedResumeProtectionSupported in another messages such as UEAssistanceInformation message or any other RRC message or in NAS message.

At some point in time, gNB/eNB sends RRCRelease message with suspendConfig to release the ongoing RRC Connection. If UE supports enhanced resume protection and gNB/eNB also supports enhanced resume protection, gNB includes enhancedResumeProtectionEnabled (can also be referred to as enhancedResumeProtectionSupported or it can be any other parameter which indicates that enhanced resume protection is enabled/supported by gNB/eNB) in RRCRelease message. enhancedResumeProtectionEnabled can be added to suspendConfig IE. In an alternate embodiment, gNB can indicate that it supports enhanced resume protection by including enhancedResumeProtectionEnabled (can also be referred to as enhancedResumeProtectionSupported or it can be any other parameter which indicates that enhanced resume protection is enabled/supported by gNB/eNB) in system information (e.g., in some SIB). In an alternate embodiment, gNB can indicate that it supports enhanced resume protection by including enhancedResumeProtectionEnabled in any other RRC message or NAS message.

UE enters RRC_INACTIVE upon receiving RRCRelease message with suspendConfig.

While UE is in RRC_INACTIVE, if criteria (e.g., UE receives paging, or UE has MO data to transmit, or UE receives paging message or RAN update/Location update is triggered, etc.) to resume RRC connection are met (or criteria to perform small data transmission procedure are met), UE initiates RRC connection resumption (or RRC connection resumption for small data transmission).

If UE supports enhanced resume protection and gNB where UE was last connected supports enhanced resume protection (e.g., enhancedResumeProtectionEnabled was received in RRCRelease suspending the last RRC connection or enhancedResumeProtectionEnabled was received (either in SI or RRC message or NAS message) from gNB where UE was last connected) and currently camped cell supports enhanced resume protection (enhancedResumeProtectionEnabled can be broadcasted in SI by current gNB): UE generates ResumeMAC-I using enhanced method for resume protection (operation 2 below). Else: UE generates ResumeMAC-I using current method (operation 1 below).

UE sends the RRCResumeRequest with ResumeMAC-I to gNB/eNB.

If the gNB/eNB to which UE has sent resume request is different than the gNB/eNB which has UE's context: the new gNB/eNB to which the UE has sent the resume request sends a context request to the old gNB/eNB which has the UE's context.

If the new gNB/eNB supports enhanced resume protection, the new gNB/eNB sends a UE's resume identity (e.g., I-RNTI), a target Cell ID, a resumeCause, a ResumeMAC-I, and a spare bit to the old gNB/eNB. UE's resume identity (e.g., I-RNTI), a target Cell ID, a resumeCause, a ResumeMAC-I, and a spare bit are received by new gNB/eNB from the UE in RRCResumeRequest message. The new gNB/eNB identifies the old gNB/eNB using the resume identity and sends the context request to the old gNB/eNB with the above information.

Alternately, if the new gNB/eNB supports enhanced resume protection and UE has generated resumeMAC-I using enhanced resume protection (new gNB can identify that UE has generated resumeMAC-I using enhanced resume protection based on indication in ResumeRequest message or LCID used for ResumeRequest, different LCID can be used in case of enhanced resume protection, LCID is carried in MAC subheader of MAC PDU carrying ResumeRequest): new gNB/eNB sends UE's resume identity (e.g., I-RNTI), target Cell ID, resumeCause, ResumeMAC-I, and spare bit to old gNB/eNB. UE's resume identity (e.g., I-RNTI), a target Cell ID, a resumeCause, a ResumeMAC-I, and a spare bit are received by new gNB/eNB from the UE in RRCResumeRequest message. The new gNB/eNB identifies the old gNB/eNB using resume identity and sends context request to it with the above information.

Else: new gNB/eNB sends only UE's resume identity (e.g., I-RNTI), target Cell ID, and ResumeMAC-I, to old gNB/eNB. The new gNB/eNB identifies the old gNB/eNB using resume identity and sends context request to it with the above information.
1> If as per UE's stored AS context, enhanced resume protection is supported by UE and enhanced resume protection is also supported old gNB/eNB, and resume cause and spare bit are received from new gNB/eNB:
2> old gNB/eNB generates ResumeMAC-I using KEY, BEARER, DIRECTION, COUNT, and MESSAGE (source PCI, target Cell-ID, source C-RNTI, resumeCause, spare bit).

1> Else:
2> old gNB/eNB generates ResumeMAC-I using KEY, BEARER, DIRECTION, COUNT, and MESSAGE (source PCI, target Cell-ID, source C-RNTI).

If the gNB/eNB to which UE has send resume request is same as the gNB/eNB which has UE's context:
1> If as per UE's stored AS context, enhanced resume protection is supported by UE and enhanced resume protection is also supported by gNB/eNB:
2> gNB/eNB generates ResumeMAC-I using KEY, BEARER, DIRECTION, COUNT, and MESSAGE (source PCI, target Cell-ID, source C-RNTI, resumeCause, spare bit).
1> Else:
2> gNB/eNB generates ResumeMAC-I using KEY, BEARER, DIRECTION, COUNT, and MESSAGE (source PCI, target Cell-ID, source C-RNTI).

ResumeMAC-I Generation Details:

Operation 1

Security Key: KEY ($K_{RRCint}$); BEARER: set to 1; DIRECTION: set to 1; and COUNT: set to 1.
MESSAGE:
source PCI (set to the physical cell identity of the primary cell (PCell) the UE was connected to prior to suspension of the RRC connection);
target Cell-ID (set to the cellIdentity of the first PLMN-Identity included in the PLMN-IdentityInfoList broadcasted in SIB1 of cell to which UE is sending resume request); and
source C-RNTI (set to C-RNTI that the UE had in the PCell it was connected to prior to suspension of the RRC connection).

Message authentication code for integrity (MAC-I) is generated over MESSAGE (set as above) using the security key (KEY) and inputs (BEARER, DIRECTION, COUNT) set as above.

Operation 2

Security Key: KEY ($K_{RRCint}$); BEARER: set to 1; DIRECTION: set to 1; and COUNT: set to 1.
MESSAGE:
source PCI (set to the physical cell identity of the PCell the UE was connected to prior to suspension of the RRC connection);
target Cell-ID (set to the cellIdentity of the first PLMN-Identity included in the PLMN-IdentityInfoList broadcasted in SIB1 of cell to which UE is sending resume request);
source C-RNTI (set to C-RNTI that the UE had in the PCell it was connected to prior to suspension of the RRC connection);
ResumeCause; and
Spare bit.
MAC-I is generated over MESSAGE (set as above) using the security key (KEY) and inputs (BEARER, DIRECTION, COUNT) set as above.

Method 2

Embodiment 1

In one embodiment of this method of this disclosure, the operation for enhanced protection for connection resume (i.e., RRCResumeRequest/RRCResumeRequest1 message) is as follows:

UE is in RRC_CONNECTED.
UE receives UECapabilityEnquiry message from gNB/eNB.
If UE supports enhanced resume protection, it indicates to gNB/eNB that its supports enhanced resume protection, i.e., UE includes enhancedResumeProtectionSupported in UECapabilityInformation message. Otherwise, enhancedResumeProtectionSupported is not included in UECapabilityInformation message. UECapabilityInformation message is sent to gNB/eNB by UE. In an alternate embodiment, if UE supports enhanced resume protection, it can indicate to gNB/eNB that its supports enhanced resume protection, by including enhancedResumeProtectionSupported in another messages such as UEAssistanceInformation message or any other RRC message or NAS message.

At some point in time, gNB/eNB sends RRCRelease message with suspendConfig to release the ongoing RRC Connection. If UE supports enhanced resume protection and gNB/eNB also supports enhanced resume protection, gNB includes enhancedResumeProtectionEnabled (can also be referred to as enhancedResumeProtectionSupported or it can be any other parameter which indicates that enhanced resume protection is enabled/supported by gNB/eNB) in RRCRelease message. enhancedResumeProtectionEnabled can be added to suspendConfig IE. In an alternate embodiment, gNB can indicate that it supports enhanced resume protection by including enhancedResumeProtectionEnabled in system information (e.g., in some SIB). In an alternate embodiment, gNB can indicate that it supports enhanced resume protection by including enhancedResumeProtectionEnabled in any other RRC message or NAS message.

UE enters RRC_INACTIVE upon receiving RRCRelease message with suspendConfig.

While UE is in RRC_INACTIVE, if criteria (e.g., UE receives paging, or UE has MO data to transmit, or UE receives paging message or RAN update/Location update is triggered, etc.) to resume RRC connection are met (or criteria to perform small data transmission procedure are met), UE initiates RRC connection resumption (or RRC connection resumption for small data transmission).

If UE supports enhanced resume protection and gNB where UE was last connected supports enhanced resume protection (e.g., enhancedResumeProtectionEnabled was received in RRCRelease suspending the last RRC connection or enhancedResumeProtectionEnabled was received (either in SI or RRC message or NAS message) from gNB where UE was last connected): UE generates ResumeMAC-I using enhanced method for resume protection (operation 2 below). Else: UE generates ResumeMAC-I using current method (operation 1 below).

UE sends the RRCResumeRequest with ResumeMAC-I to gNB/eNB.

If the gNB/eNB to which UE has sent resume request is different than the gNB/eNB which has UE's context: the new gNB/eNB to which the UE has sent the resume request sends a context request to the old gNB/eNB which has the UE's context.

If the new gNB/eNB supports enhanced resume protection, the new gNB/eNB sends a UE's resume identity (e.g., I-RNTI), a target Cell ID, a resumeCause, and a ResumeMAC-I, to the old gNB/eNB. UE's resume identity (e.g., I-RNTI), a target Cell ID, a resumeCause, and a ResumeMAC-I are received by new gNB/eNB from the UE in RRCResumeRequest message. The new gNB/eNB identifies the old gNB/eNB using the resume identity and sends the context request to the old gNB/eNB with the above information.

Alternately, if the new gNB/eNB supports enhanced resume protection and UE has generated resumeMAC-I using enhanced resume protection (new gNB can identify that UE has generated resumeMAC-I using enhanced resume protection based on indication in ResumeRequest message or LCID used for ResumeRequest, different LCID can be used in case of enhanced resume protection, LCID is carried in MAC subheader of MAC PDU carrying ResumeRequest): new gNB/eNB sends UE's resume identity (e.g., I-RNTI), target Cell ID, resumeCause, and ResumeMAC-I, to old gNB/eNB. UE's resume identity (e.g., I-RNTI), a target Cell ID, a resumeCause, and a ResumeMAC-I are received by new gNB/eNB from the UE in RRCResumeRequest message. The new gNB/eNB identifies the old gNB/eNB using resume identity and sends context request to it with the above information.

Else: new gNB/eNB sends only UE's resume identity (e.g., I-RNTI), target Cell ID, and ResumeMAC-I, to old gNB/eNB. The new gNB/eNB identifies the old gNB/eNB using resume identity and sends context request to it with the above information.
1> If as per UE's stored AS context, enhanced resume protection is supported by UE and enhanced resume protection is also supported old gNB/eNB: the old gNB/eNB identifies whether a resume cause is received from the new gNB/eNB.
2> If resume cause is received from new gNB/eNB: old gNB/eNB generates ResumeMAC-I using KEY, BEARER, DIRECTION, COUNT, and MESSAGE (source PCI, target Cell-ID, source C-RNTI, resumeCause).
2> Else old gNB/eNB generates ResumeMAC-I using KEY, BEARER, DIRECTION, COUNT, and MESSAGE (source PCI, target Cell-ID, source C-RNTI, resumeCause). This is performed for each resumeCause value until ResumeMAC-I is verified. Various ResumeCauses are pre-defined. Alternately, ResumeMAC-I verification is considered failed and RRCReject is sent by new gNB to UE.
1> Else:
2> old gNB/eNB generates ResumeMAC-I using KEY, BEARER, DIRECTION, COUNT, and MESSAGE (source PCI, target Cell-ID, source C-RNTI).

If the gNB/eNB to which UE has send resume request is same as the gNB/eNB which has UE's context:
1> If as per UE's stored AS context, enhanced resume protection is supported by UE and enhanced resume protection is also supported by gNB/eNB:
2> gNB/eNB generates ResumeMAC-I using KEY, BEARER, DIRECTION, COUNT, and MESSAGE (source PCI, target Cell-ID, source C-RNTI, resumeCause).
1> Else:
2> gNB/eNB generates ResumeMAC-I using KEY, BEARER, DIRECTION, COUNT, and MESSAGE (source PCI, target Cell-ID, source C-RNTI).

Embodiment 2

In another embodiment of this method of this disclosure, the operation for enhanced protection for connection resume (i.e., RRCResumeRequest/RRCResumeRequest1 message) is as follows:
UE is in RRC_CONNECTED.
UE receives UECapabilityEnquiry message from gNB/eNB.

If UE supports enhanced resume protection, it indicates to gNB/eNB that its supports enhanced resume protection, i.e., UE includes enhancedResumeProtectionSupported in UECapabilityInformation message. Otherwise, enhancedResumeProtectionSupported is not included in UECapabilityInformation message. UECapabilityInformation message is sent to gNB/eNB by UE. In an alternate embodiment, if UE supports enhanced resume protection, it can indicate to gNB/eNB that its supports enhanced resume protection, by including enhancedResumeProtectionSupported (can also be referred to as enhancedResumeProtectionEnabled or it can be any other parameter which indicates that enhanced resume protection is enabled/supported by gNB/eNB) in another messages such as UEAssistanceInformation message or any other RRC message or NAS message.

At some point in time, gNB/eNB sends RRCRelease message with suspendConfig to release the ongoing RRC Connection. If UE supports enhanced resume protection and gNB/eNB also supports enhanced resume protection, gNB includes enhancedResumeProtectionEnabled in RRCRelease message. enhancedResumeProtectionEnabled can be added to suspendConfig IE. In an alternate embodiment, gNB can indicate that it supports enhanced resume protection by including enhancedResumeProtectionEnabled in system information (e.g., in some SIB). In an alternate embodiment, gNB can indicate that it supports enhanced resume protection by including enhancedResumeProtectionEnabled in any other RRC message or NAS message.

UE enters RRC_INACTIVE upon receiving RRCRelease message with suspendConfig.

While UE is in RRC_INACTIVE, if criteria (e.g., UE receives paging, or UE has MO data to transmit, or UE receives paging message or RAN update/Location update is triggered, etc.) to resume RRC connection are met (or criteria to perform small data transmission procedure are met), UE initiates RRC connection resumption (or RRC connection resumption for small data transmission).

If UE supports enhanced resume protection and gNB where UE was last connected supports enhanced resume protection (e.g., enhancedResumeProtectionEnabled was received in RRCRelease suspending the last RRC connection or enhancedResumeProtectionEnabled was received (either in SI or RRC message or NAS message) from gNB where UE was last connected) and currently camped cell supports enhanced resume protection (enhancedResumeProtectionEnabled can be broadcasted in SI by current gNB): UE generates ResumeMAC-I using enhanced method for resume protection (operation 2 below). Else: UE generates ResumeMAC-I using current method (operation 1 below).

UE sends the RRCResumeRequest with ResumeMAC-I to gNB/eNB.

If the gNB/eNB to which UE has sent resume request is different than the gNB/eNB which has UE's context: the new gNB/eNB to which the UE has sent the resume request sends a context request to the old gNB/eNB which has the UE's context.

If the new gNB/eNB supports enhanced resume protection, the new gNB/eNB sends a UE's resume identity (e.g., I-RNTI), a target Cell ID, a resumeCause, and a ResumeMAC-I, to the old gNB/eNB. UE's resume identity (e.g., I-RNTI), a target Cell ID, a resumeCause, and a ResumeMAC-I are received by new gNB/eNB from the UE in RRCResumeRequest message. The new gNB/eNB identifies the old gNB/eNB using the resume identity and sends the context request to the old gNB/eNB with the above information.

Alternately, if the new gNB/eNB supports enhanced resume protection and UE has generated resumeMAC-I using enhanced resume protection (new gNB can identify that UE has generated resumeMAC-I using enhanced resume protection based on indication in ResumeRequest message or LCID used for ResumeRequest, different LCID can be used in case of enhanced resume protection, LCID is carried in MAC subheader of MAC PDU carrying ResumeRequest): new gNB/eNB sends UE's resume identity (e.g., I-RNTI), target Cell ID, resumeCause, and ResumeMAC-I, to old gNB/eNB. UE's resume identity (e.g., I-RNTI), a target Cell ID, a resumeCause, and a ResumeMAC-I are received by new gNB/eNB from the UE in RRCResumeRequest message. The new gNB/eNB identifies the old gNB/eNB using resume identity and sends context request to it with the above information.

Else: new gNB/eNB sends only UE's resume identity (e.g., I-RNTI), target Cell ID, and ResumeMAC-I, to old gNB/eNB. The new gNB/eNB identifies the old gNB/eNB using resume identity and sends context request to it with the above information.
   1> If as per UE's stored AS context, enhanced resume protection is supported by UE and enhanced resume protection is also supported old gNB/eNB and if resume ause is received from new gNB:
   2> old gNB/eNB generates ResumeMAC-I using KEY, BEARER, DIRECTION, COUNT, and MESSAGE (source PCI, target Cell-ID, source C-RNTI, resumeCause).
   1> Else:
   2> old gNB/eNB generates ResumeMAC-I using KEY, BEARER, DIRECTION, COUNT, and MESSAGE (source PCI, target Cell-ID, source C-RNTI).
If the gNB/eNB to which UE has send resume request is same as the gNB/eNB which has UE's context:
   1> If as per UE's stored AS context, enhanced resume protection is supported by UE and enhanced resume protection is also supported by gNB/eNB:
   2> gNB/eNB generates ResumeMAC-I using KEY, BEARER, DIRECTION, COUNT, and MESSAGE (source PCI, target Cell-ID, source C-RNTI, resumeCause).
   1> Else:
   2> gNB/eNB generates ResumeMAC-I using KEY, BEARER, DIRECTION, COUNT, and MESSAGE (source PCI, target Cell-ID, source C-RNTI).
ResumeMAC-I Generation Details:

Operation 1

Security Key: KEY ($K_{RRCint}$); BEARER: set to 1; DIRECTION: set to 1; and COUNT: set to 1.
   MESSAGE:
   source PCI (set to the physical cell identity of the PCell the UE was connected to prior to suspension of the RRC connection);
   target Cell-ID (set to the cellIdentity of the first PLMN-Identity included in the PLMN-IdentityInfoList broadcasted in SIB1 of cell to which UE is sending resume request); and
   source C-RNTI (set to C-RNTI that the UE had in the PCell it was connected to prior to suspension of the RRC connection).
MAC-I is generated over MESSAGE (set as above) using the security key (KEY) and inputs (BEARER, DIRECTION, COUNT) set as above.

Operation 2

Security Key: KEY ($K_{RRCint}$); BEARER: set to 1; DIRECTION: set to 1; and COUNT: set to 1.
   MESSAGE:
   source PCI (set to the physical cell identity of the PCell the UE was connected to prior to suspension of the RRC connection);
   target Cell-ID (set to the cellIdentity of the first PLMN-Identity included in the PLMN-IdentityInfoList broadcasted in SIB1 of cell to which UE is sending resume request);
   source C-RNTI (set to C-RNTI that the UE had in the PCell it was connected to prior to suspension of the RRC connection); and
   ResumeCause.
MAC-I is generated over MESSAGE (set as above) using the security key (KEY) and inputs (BEARER, DIRECTION, COUNT) set as above.

Method 3

Embodiment 1

In one embodiment of this method of this disclosure, the operation for enhanced protection for connection resume (i.e., RRCResumeRequest/RRCResumeRequest1 message) is as follows:
UE is in RRC_CONNECTED.
UE receives UECapabilityEnquiry message from gNB/eNB.
If UE supports enhanced resume protection, it indicates to gNB/eNB that its supports enhanced resume protection, i.e., UE includes enhancedResumeProtectionSupported in UECapabilityInformation message. Otherwise, enhancedResumeProtectionSupported is not included in UECapabilityInformation message. UECapabilityInformation message is sent to gNB/eNB by UE. In an alternate embodiment, if UE supports enhanced resume protection, it can indicate to gNB/eNB that its supports enhanced resume protection, by including enhancedResumeProtectionSupported in another messages such as UEAssistanceInformation message or any other RRC message or NAS message.
At some point in time, gNB/eNB sends RRCRelease message with suspendConfig to release the ongoing RRC Connection. If UE supports enhanced resume protection and gNB/eNB also supports enhanced resume protection, gNB includes enhancedResumeProtectionEnabled (can also be referred to as enhancedResumeProtectionEnabled or it can be any other parameter which indicates that enhanced resume protection is enabled/supported by gNB/eNB) in RRCRelease message. enhancedResumeProtectionEnabled can be added to suspendConfig IE. In an alternate embodiment, gNB can indicate that it supports enhanced resume protection by including enhancedResumeProtectionEnabled in system information (e.g., in some SIB). In an alternate embodiment, gNB can indicate that it supports enhanced resume protection by including enhancedResumeProtectionEnabled in any other RRC message.
UE enters RRC_INACTIVE upon receiving RRCRelease message with suspendConfig.
While UE is in RRC_INACTIVE, if criteria (e.g., UE receives paging, or UE has MO data to transmit, or UE receives paging message or RAN update/Location update is triggered, etc.) to resume RRC connection are met (or criteria to perform small data transmission procedure are met), UE initiates RRC connection resumption (or RRC connection resumption for small data transmission).

If UE supports enhanced resume protection and gNB where UE was last connected supports enhanced resume protection (e.g., enhancedResumeProtectionEnabled was received in RRCRelease suspending the last RRC connection or enhancedResumeProtectionEnabled was received (either in SI or RRC message or NAS message) from gNB where UE was last connected): UE generates Resume-MAC-I using enhanced method for resume protection (operation 2 below). Else: UE generates ResumeMAC-I using current method (operation 1 below).

UE sends the RRCResumeRequest with ResumeMAC-I to gNB/eNB.

If the gNB/eNB to which UE has sent resume request is different than the gNB/eNB which has UE's context: the new gNB/eNB to which the UE has sent the resume request sends a context request to the old gNB/eNB which has the UE's context.

If the new gNB/eNB supports enhanced resume protection, the new gNB/eNB sends a UE's resume identity (e.g., I-RNTI), a target Cell ID, a resumeCause, a ResumeMAC-I, and a spare bit to the old gNB/eNB. UE's resume identity (e.g., I-RNTI), a target Cell ID, a resumeCause, a Resume-MAC-I, and a spare bit are received by new gNB/eNB from the UE in RRCResumeRequest message. The new gNB/eNB identifies the old gNB/eNB using the resume identity and sends the context request to the old gNB/eNB with the above information.

Alternately, if the new gNB/eNB supports enhanced resume protection and UE has generated resumeMAC-I using enhanced resume protection (new gNB can identify that UE has generated resumeMAC-I using enhanced resume protection based on indication in ResumeRequest message or LCID used for ResumeRequest, different LCID can be used in case of enhanced resume protection, LCID is carried in MAC subheader of MAC PDU carrying ResumeRequest): new gNB/eNB sends UE's resume identity (e.g., I-RNTI), target Cell ID, resumeCause, ResumeMAC-I, and spare bit to old gNB/eNB. UE's resume identity (e.g., I-RNTI), a target Cell ID, a resumeCause, a ResumeMAC-I, and a spare bit are received by new gNB/eNB from the UE in RRCResumeRequest message. The new gNB/eNB identifies the old gNB/eNB using resume identity and sends context request to it with the above information.

Else: new gNB/eNB sends only UE's resume identity (e.g., I-RNTI), target Cell ID, and ResumeMAC-I, to old gNB/eNB. The new gNB/eNB identifies the old gNB/eNB using resume identity and sends context request to it with the above information.

1> If as per UE's stored AS context, enhanced resume protection is supported by UE and enhanced resume protection is also supported old gNB/eNB: the old gNB/eNB identifies whether a resume cause and a spare bit are received from the new gNB/eNB.
2> If resume cause and spare bit are received from new gNB/eNB: old gNB/eNB generates ResumeMAC-I using KEY, BEARER, DIRECTION, COUNT, and MESSAGE (source PCI, target Cell-ID, source C-RNTI, resumeCause, spare bit, ResumeIdentity).
2> Else ResumeMAC-I verification is considered failed and RRCReject is sent by new gNB to UE.
1> Else:
2> old gNB/eNB generates ResumeMAC-I using KEY, BEARER, DIRECTION, COUNT, and MESSAGE (source PCI, target Cell-ID, source C-RNTI).

If the gNB/eNB to which UE has send resume request is same as the gNB/eNB which has UE's context:
1> If as per UE's stored AS context, enhanced resume protection is supported by UE and enhanced resume protection is also supported by gNB/eNB:
2> gNB/eNB generates ResumeMAC-I using KEY, BEARER, DIRECTION, COUNT, and MESSAGE (source PCI, target Cell-ID, source C-RNTI, resumeCause, spare bit, ResumeIdentity).
1> Else:
2> gNB/eNB generates ResumeMAC-I using KEY, BEARER, DIRECTION, COUNT, and MESSAGE (source PCI, target Cell-ID, source C-RNTI).

Embodiment 2

In another embodiment of this method of this disclosure, the operation for enhanced protection for connection resume (i.e., RRCResumeRequest/RRCResumeRequest1 message) is as follows:

UE is in RRC_CONNECTED.

UE receives UECapabilityEnquiry message from gNB/eNB.

If UE supports enhanced resume protection, it indicates to gNB/eNB that its supports enhanced resume protection, i.e., UE includes enhancedResumeProtectionSupported in UECapabilityInformation message. Otherwise, enhancedResumeProtectionSupported is not included in UECapabilityInformation message. UECapabilityInformation message is sent to gNB/eNB by UE. In an alternate embodiment, if UE supports enhanced resume protection, it can indicate to gNB/eNB that its supports enhanced resume protection, by including enhancedResumeProtectionSupported in another messages such as UEAssistanceInformation message or any other RRC message or NAS message.

At some point in time, gNB/eNB sends RRCRelease message with suspendConfig to release the ongoing RRC Connection. If UE supports enhanced resume protection and gNB/eNB also supports enhanced resume protection, gNB includes enhancedResumeProtectionEnabled (can also be referred to as enhancedResumeProtectionSupported or it can be any other parameter which indicates that enhanced resume protection is enabled/supported by gNB/eNB) in RRCRelease message. enhancedResumeProtectionEnabled can be added to suspendConfig IE. In an alternate embodiment, gNB can indicate that it supports enhanced resume protection by including enhancedResumeProtectionEnabled in system information (e.g., in some SIB). In an alternate embodiment, gNB can indicate that it supports enhanced resume protection by including enhancedResumeProtectionEnabled in any other RRC message or NAS message.

UE enters RRC_INACTIVE upon receiving RRCRelease message with suspendConfig.

While UE is in RRC_INACTIVE, if criteria (e.g., UE receives paging, or UE has MO data to transmit, or UE receives paging message or RAN update/Location update is triggered, etc.) to resume RRC connection are met (or criteria to perform small data transmission procedure are met), UE initiates RRC connection resumption (or RRC connection resumption for small data transmission).

If UE supports enhanced resume protection and gNB where UE was last connected supports enhanced resume protection (e.g., enhancedResumeProtectionEnabled was received in RRCRelease suspending the last RRC connection or enhancedResumeProtectionEnabled was received (either in SI or RRC message or NAS message) from gNB where UE was last connected) and currently camped cell supports enhanced resume protection (enhancedResumeProtectionEnabled can be broadcasted in SI by current gNB): UE generates ResumeMAC-I using enhanced method for resume protection (operation 2 below). Else: UE generates ResumeMAC-I using current method (operation 1 below).

UE sends the RRCResumeRequest with ResumeMAC-I to gNB/eNB.

If the gNB/eNB to which UE has sent resume request is different than the gNB/eNB which has UE's context: the new gNB/eNB to which the UE has sent the resume request sends a context request to the old gNB/eNB which has the UE's context.

If the new gNB/eNB supports enhanced resume protection, the new gNB/eNB sends a UE's resume identity (e.g., I-RNTI), a target Cell ID, a resumeCause, a ResumeMAC-I, and a spare bit to the old gNB/eNB. UE's resume identity (e.g., I-RNTI), a target Cell ID, a resumeCause, a ResumeMAC-I, and a spare bit are received by new gNB/eNB from the UE in RRCResumeRequest message. The new gNB/eNB identifies the old gNB/eNB using the resume identity and sends the context request to the old gNB/eNB with the above information.

Alternately, if the new gNB/eNB supports enhanced resume protection and UE has generated resumeMAC-I using enhanced resume protection (new gNB can identify that UE has generated resumeMAC-I using enhanced resume protection based on indication in ResumeRequest message or LCID used for ResumeRequest, different LCID can be used in case of enhanced resume protection, LCID is carried in MAC subheader of MAC PDU carrying ResumeRequest): new gNB/eNB sends UE's resume identity (e.g., I-RNTI), target Cell ID, resumeCause, ResumeMAC-I, and spare bit to old gNB/eNB. UE's resume identity (e.g., I-RNTI), a target Cell ID, a resumeCause, a ResumeMAC-I, and a spare bit are received by new gNB/eNB from the UE in RRCResumeRequest message. The new gNB/eNB identifies the old gNB/eNB using resume identity and sends context request to it with the above information.

Else: new gNB/eNB sends only UE's resume identity (e.g., I-RNTI), target Cell ID, and ResumeMAC-I, to old gNB/eNB. The new gNB/eNB identifies the old gNB/eNB using resume identity and sends context request to it with the above information.

1> If as per UE's stored AS context, enhanced resume protection is supported by UE and enhanced resume protection is also supported old gNB/eNB and if resumeCause and spare bit are received from new gNB:
2> old gNB/eNB generates ResumeMAC-I using KEY, BEARER, DIRECTION, COUNT, and MESSAGE (source PCI, target Cell-ID, source C-RNTI, resumeCause, spare bit, ResumeIdentity).
1> Else:
2> old gNB/eNB generates ResumeMAC-I using KEY, BEARER, DIRECTION, COUNT, and MESSAGE (source PCI, target Cell-ID, source C-RNTI).

If the gNB/eNB to which UE has send resume request is same as the gNB/eNB which has UE's context:
1> If as per UE's stored AS context, enhanced resume protection is supported by UE and enhanced resume protection is also supported by gNB/eNB:
2> gNB/eNB generates ResumeMAC-I using KEY, BEARER, DIRECTION, COUNT, and MESSAGE (source PCI, target Cell-ID, source C-RNTI, resumeCause, spare bit, ResumeIdentity).

1> Else:
2> gNB/eNB generates ResumeMAC-I using KEY, BEARER, DIRECTION, COUNT, and MESSAGE (source PCI, target Cell-ID, source C-RNTI).

ResumeMAC-I Generation Details:

Operation 1

Security Key: KEY ($K_{RRCint}$); BEARER: set to 1; DIRECTION: set to 1; and COUNT: set to 1.
MESSAGE:
  source PCI (set to the physical cell identity of the PCell the UE was connected to prior to suspension of the RRC connection);
  target Cell-ID (set to the cellIdentity of the first PLMN-Identity included in the PLMN-IdentityInfoList broadcasted in SIB1 of cell to which UE is sending resume request); and
  source C-RNTI (set to C-RNTI that the UE had in the PCell it was connected to prior to suspension of the RRC connection).
MAC-I is generated over MESSAGE (set as above) using the security key (KEY) and inputs (BEARER, DIRECTION, COUNT) set as above.

Operation 2

Security Key: KEY ($K_{RRCint}$); BEARER: set to 1; DIRECTION: set to 1; and COUNT: set to 1.
MESSAGE:
  source PCI (set to the physical cell identity of the PCell the UE was connected to prior to suspension of the RRC connection);
  target Cell-ID (set to the cellIdentity of the first PLMN-Identity included in the PLMN-IdentityInfoList broadcasted in SIB1 of cell to which UE is sending resume request);
  source C-RNTI (set to C-RNTI that the UE had in the PCell it was connected to prior to suspension of the RRC connection);
  ResumeCause;
  Spare bit; and
  Resume Identity.
MAC-I is generated over MESSAGE (set as above) using the security key (KEY) and inputs (BEARER, DIRECTION, COUNT) set as above.

Method 4

Embodiment 1

In one embodiment of this method of this disclosure, the operation for enhanced protection for connection resume (i.e., RRCResumeRequest/RRCResumeRequest1 message) is as follows:

UE is in RRC_CONNECTED.

UE receives UECapabilityEnquiry message from gNB/eNB.

If UE supports enhanced resume protection, it indicates to gNB/eNB that its supports enhanced resume protection, i.e., UE includes enhancedResumeProtectionSupported in UECapabilityInformation message. Otherwise, enhancedResumeProtectionSupported is not included in UECapabilityInformation message. UECapabilityInformation message is sent to gNB/eNB by UE. In an alternate embodiment, if UE supports enhanced resume protection, it can indicate to gNB/eNB that its supports enhanced resume protection, by including enhancedResumeProtectionSupported in another messages such as UEAssistanceInformation message or any other RRC message or NAS message.

At some point in time, gNB/eNB sends RRCRelease message with suspendConfig to release the ongoing RRC Connection. If UE supports enhanced resume protection and gNB/eNB also supports enhanced resume protection, gNB includes enhancedResumeProtectionEnabled (can also be referred to as enhancedResumeProtectionSupported or it can be any other parameter which indicates that enhanced resume protection is enabled/supported by gNB/eNB) in RRCRelease message. enhancedResumeProtectionEnabled can be added to suspendConfig IE. In an alternate embodiment, gNB can indicate that it supports enhanced resume protection by including enhancedResumeProtectionEnabled in system information (e.g., in some SIB). In an alternate embodiment, gNB can indicate that it supports enhanced resume protection by including enhancedResumeProtection-Enabled in any other RRC message or NAS message.

UE enters RRC_INACTIVE upon receiving RRCRelease message with suspendConfig.

While UE is in RRC_INACTIVE, if criteria (e.g., UE receives paging, or UE has MO data to transmit, or UE receives paging message or RAN update/Location update is triggered, etc.) to resume RRC connection are met (or criteria to perform small data transmission procedure are met), UE initiates RRC connection resumption (or RRC connection resumption for small data transmission).

If UE supports enhanced resume protection and gNB where UE was last connected supports enhanced resume protection (e.g., enhancedResumeProtectionEnabled was received in RRCRelease suspending the last RRC connection or enhancedResumeProtectionEnabled was received (either in SI or RRC message or NAS message) from gNB where UE was last connected): UE generates Resume-MAC-I using enhanced method for resume protection (operation 2 below). Else: UE generates ResumeMAC-I using current method (operation 1 below).

UE sends the RRCResumeRequest with ResumeMAC-I to gNB/eNB.

If the gNB/eNB to which UE has sent resume request is different than the gNB/eNB which has UE's context: the new gNB/eNB to which the UE has sent the resume request sends a context request to the old gNB/eNB which has the UE's context.

If the new gNB/eNB supports enhanced resume protection, the new gNB/eNB sends a UE's resume identity (e.g., I-RNTI), a target Cell ID, a resumeCause, and a Resume-MAC-I, to the old gNB/eNB. UE's resume identity (e.g., I-RNTI), a target Cell ID, a resumeCause, and a Resume-MAC-I are received by new gNB/eNB from the UE in RRCResumeRequest message. The new gNB/eNB identifies the old gNB/eNB using the resume identity and sends the context request to the old gNB/eNB with the above information.

Alternately, if the new gNB/eNB supports enhanced resume protection and UE has generated resumeMAC-I using enhanced resume protection (new gNB can identify that UE has generated resumeMAC-I using enhanced resume protection based on indication in ResumeRequest message or LCID used for ResumeRequest, different LCID can be used in case of enhanced resume protection, LCID is carried in MAC subheader of MAC PDU carrying ResumeRequest): new gNB/eNB sends UE's resume identity (e.g., I-RNTI), target Cell ID, resumeCause, and a ResumeMAC-I, to old gNB/eNB. UE's resume identity (e.g., I-RNTI), a target Cell ID, a resumeCause, and a ResumeMAC-I are received by new gNB/eNB from the UE in RRCResumeRequest message. The new gNB/eNB identifies the old gNB/eNB using resume identity and sends context request to it with the above information.

Else: new gNB/eNB sends only UE's resume identity (e.g., I-RNTI), target Cell ID, and ResumeMAC-I, to old gNB/eNB. The new gNB/eNB identifies the old gNB/eNB using resume identity and sends context request to it with the above information.

1> If as per UE's stored AS context, enhanced resume protection is supported by UE and enhanced resume protection is also supported old gNB/eNB: the old gNB/eNB identifies whether a resume cause is received from the new gNB/eNB.
2> If resume cause is received from new gNB/eNB: old gNB/eNB generates ResumeMAC-I using KEY, BEARER, DIRECTION, COUNT, and MESSAGE (source PCI, target Cell-ID, source C-RNTI, resumeCause, resumeIdentity).
2> Else ResumeMAC-I verification is considered failed and RRCReject is sent by new gNB to UE.
1> Else:
2> old gNB/eNB generates ResumeMAC-I using KEY, BEARER, DIRECTION, COUNT, and MESSAGE (source PCI, target Cell-ID, source C-RNTI).

If the gNB/eNB to which UE has send resume request is same as the gNB/eNB which has UE's context:
1> If as per UE's stored AS context, enhanced resume protection is supported by UE and enhanced resume protection is also supported by gNB/eNB:
2> gNB/eNB generates ResumeMAC-I using KEY, BEARER, DIRECTION, COUNT, and MESSAGE (source PCI, target Cell-ID, source C-RNTI, resumeCause, resumeIdentity).
1> Else:
2> gNB/eNB generates ResumeMAC-I using KEY, BEARER, DIRECTION, COUNT, and MESSAGE (source PCI, target Cell-ID, source C-RNTI).

Embodiment 2 in another embodiment of this method of this disclosure, the operation for enhanced protection for connection resume (i.e., RRCResumeRequest/RRCResumeRequest1 message) is as follows:

UE is in RRC_CONNECTED.

UE receives UECapabilityEnquiry message from gNB/eNB.

If UE supports enhanced resume protection, it indicates to gNB/eNB that its supports enhanced resume protection, i.e., UE includes enhancedResumeProtectionSupported in UECapabilityInformation message. Otherwise, enhancedResumeProtectionSupported is not included in UECapabilityInformation message. UECapabilityInformation message is sent to gNB/eNB by UE. In an alternate embodiment, if UE supports enhanced resume protection, it can indicate to gNB/eNB that its supports enhanced resume protection, by including enhancedResumeProtectionSupported in another messages such as UEAssistanceInformation message or any other RRC message or NAS message.

At some point in time, gNB/eNB sends RRCRelease message with suspendConfig to release the ongoing RRC Connection. If UE supports enhanced resume protection and gNB/eNB also supports enhanced resume protection, gNB includes enhancedResumeProtectionEnabled (can also be referred as enhancedResumeProtectionSupported or it can be any other parameter which indicates that enhanced resume protection is enabled/supported by gNB/eNB) in RRCRelease message. enhancedResumeProtectionEnabled can be added to suspendConfig IE. In an alternate embodiment, gNB can indicate that it supports enhanced resume protection by including enhancedResumeProtectionEnabled in system information (e.g., in some SIB). In an alternate embodiment, gNB can indicate that it supports enhanced resume protection by including enhancedResumeProtectionEnabled in any other RRC message or NAS message.

UE enters RRC_INACTIVE upon receiving RRCRelease message with suspendConfig.

While UE is in RRC_INACTIVE, if criteria (e.g., UE receives paging, or UE has MO data to transmit, or UE receives paging message or RAN update/Location update is triggered, etc.) to resume RRC connection are met (or criteria to perform small data transmission procedure are met), UE initiates RRC connection resumption (or RRC connection resumption for small data transmission).

If UE supports enhanced resume protection and gNB where UE was last connected supports enhanced resume protection (e.g., enhancedResumeProtectionEnabled was received in RRCRelease suspending the last RRC connection or enhancedResumeProtectionEnabled was received (either in SI or RRC message or NAS message) from gNB where UE was last connected) and currently camped cell supports enhanced resume protection (enhancedResumeProtectionEnabled can be broadcasted in SI by current gNB): UE generates ResumeMAC-I using enhanced method for resume protection (operation 2 below). Else: UE generates ResumeMAC-I using current method (operation 1 below).

UE sends the RRCResumeRequest with ResumeMAC-I to gNB/eNB.

If the gNB/eNB to which UE has sent resume request is different than the gNB/eNB which has UE's context: the new gNB/eNB to which the UE has sent the resume request sends a context request to the old gNB/eNB which has the UE's context.

If the new gNB/eNB supports enhanced resume protection, the new gNB/eNB sends a UE's resume identity (e.g., I-RNTI), a target Cell ID, a resumeCause, and a Resume-MAC-I, to the old gNB/eNB. UE's resume identity (e.g., I-RNTI), a target Cell ID, a resumeCause, and a Resume-MAC-I are received by new gNB/eNB from the UE in RRCResumeRequest message. The new gNB/eNB identifies the old gNB/eNB using the resume identity and sends the context request to the old gNB/eNB with the above information.

Alternately, if the new gNB/eNB supports enhanced resume protection and UE has generated resumeMAC-I using enhanced resume protection (new gNB can identify that UE has generated resumeMAC-I using enhanced resume protection based on indication in ResumeRequest message or LCID used for ResumeRequest, different LCID can be used in case of enhanced resume protection, LCID is carried in MAC subheader of MAC PDU carrying ResumeRequest): new gNB/eNB sends UE's resume identity (e.g., I-RNTI), target Cell ID, resumeCause, and ResumeMAC-I, to old gNB/eNB. UE's resume identity (e.g., I-RNTI), a target Cell ID, a resumeCause, and a ResumeMAC-I are received by new gNB/eNB from the UE in RRCResumeRequest message. The new gNB/eNB identifies the old gNB/eNB using resume identity and sends context request to it with the above information.

Else: new gNB/eNB sends only UE's resume identity (e.g., I-RNTI), target Cell ID, and ResumeMAC-I, to old gNB/eNB. The new gNB/eNB identifies the old gNB/eNB using resume identity and sends context request to it with the above information.

1> If as per UE's stored AS context, enhanced resume protection is supported by UE and enhanced resume protection is also supported old gNB/eNB:
2> old gNB/eNB generates ResumeMAC-I using KEY, BEARER, DIRECTION, COUNT, and MESSAGE (source PCI, target Cell-ID, source C-RNTI, resumeCause, resumeIdentity).
1> Else:
2> old gNB/eNB generates ResumeMAC-I using KEY, BEARER, DIRECTION, COUNT, and MESSAGE (source PCI, target Cell-ID, source C-RNTI).

If the gNB/eNB to which UE has send resume request is same as the gNB/eNB which has UE's context:
1> If as per UE's stored AS context, enhanced resume protection is supported by UE and enhanced resume protection is also supported by gNB/eNB:
2> gNB/eNB generates ResumeMAC-I using KEY, BEARER, DIRECTION, COUNT, and MESSAGE (source PCI, target Cell-ID, source C-RNTI, resumeCause, resumeIdentity).
1> Else:
2> gNB/eNB generates ResumeMAC-I using KEY, BEARER, DIRECTION, COUNT, and MESSAGE (source PCI, target Cell-ID, source C-RNTI).

ResumeMAC-I Generation Details:

Operation 1

Security Key: KEY ($K_{RRCint}$); BEARER: set to 1; DIRECTION: set to 1; and COUNT: set to 1.
MESSAGE:
source PCI (set to the physical cell identity of the PCell the UE was connected to prior to suspension of the RRC connection);
target Cell-ID (set to the cellIdentity of the first PLMN-Identity included in the PLMN-IdentityInfoList broadcasted in SIB1 of cell to which UE is sending resume request); and
source C-RNTI (set to C-RNTI that the UE had in the PCell it was connected to prior to suspension of the RRC connection).
MAC-I is generated over MESSAGE (set as above) using the security key (KEY) and inputs (BEARER, DIRECTION, COUNT) set as above.

Operation 2

Security Key: KEY ($K_{RRCint}$); BEARER: set to 1; DIRECTION: set to 1; and COUNT: set to 1.
MESSAGE:
source PCI (set to the physical cell identity of the PCell the UE was connected to prior to suspension of the RRC connection);
target Cell-ID (set to the cellIdentity of the first PLMN-Identity included in the PLMN-IdentityInfoList broadcasted in SIB1 of cell to which UE is sending resume request);
source C-RNTI (set to C-RNTI that the UE had in the PCell it was connected to prior to suspension of the RRC connection);
ResumeCause; and
ResumeIdentity.
MAC-I is generated over MESSAGE (set as above) using the security key (KEY) and inputs (BEARER, DIRECTION, COUNT) set as above.

Small Data Transmission

In the 5G wireless communication system, small data transmission (SDT) in RRC_INACTIVE is supported. The uplink data can be transmitted in message 3 (Msg3) in case of 4-step random access (RA) procedure and in MSGA in case of 2-step RA procedure.

Figure 2:
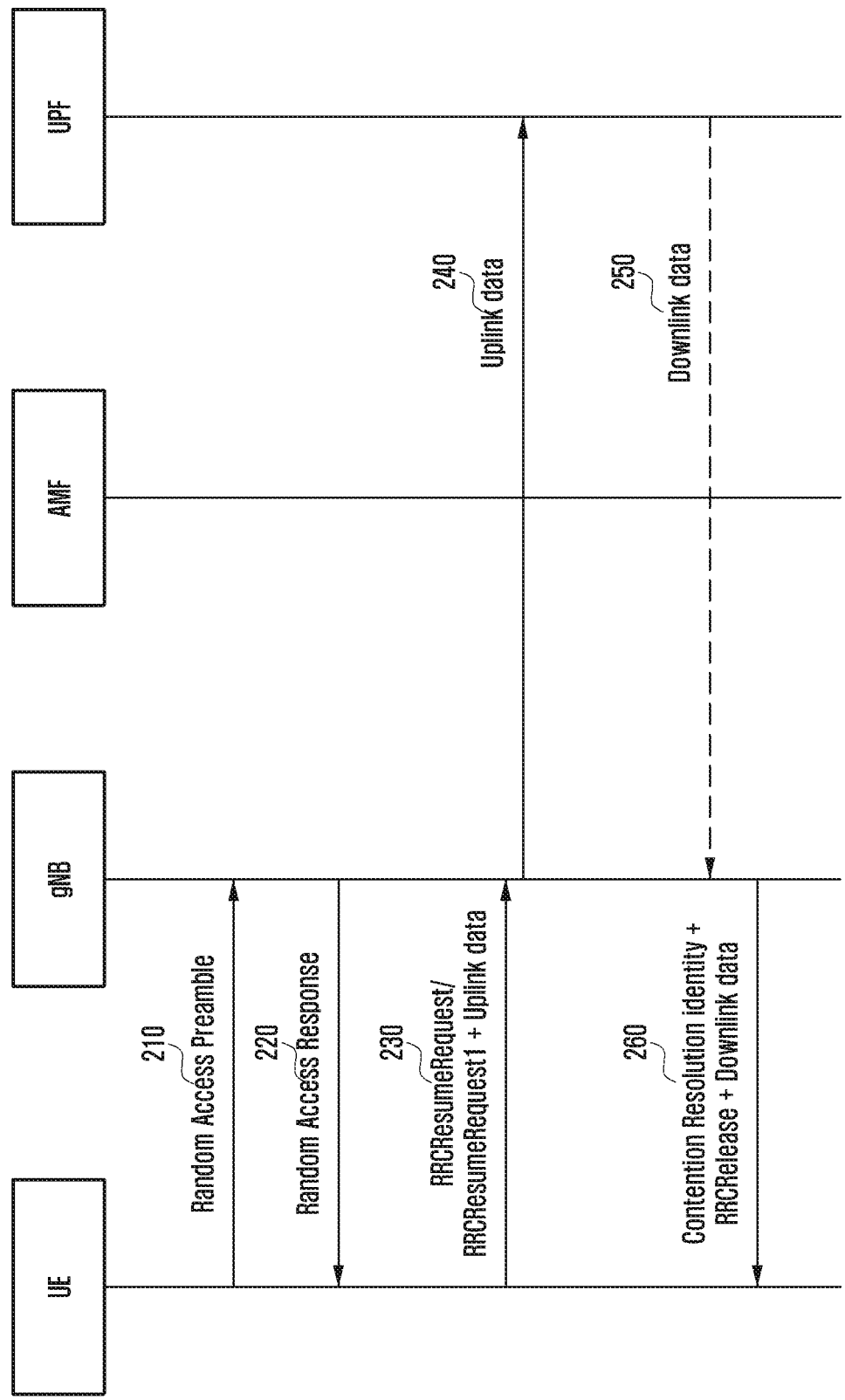
FIG. 2 is an example signaling flow for small data transmission using 4-step RA according to an embodiment of the disclosure.

FIG. 2 is an example signaling flow for small data transmission using 4-step RA according to an embodiment of the disclosure.

If criteria to initiate 4-step RA for SDT are met, UE selects preamble/random access channel (RACH) occasion (RO) from preambles/ROs for SDT. UE transmits random access preamble at operation 210, and receives random access response (RAR) including UL grant for Msg3 transmission at operation 220.

The UE sends an RRCResumeRequest/RRCResumeRequest1 and uplink data to the gNB (same as the last serving gNB) on signaling radio bearer 0 (SRB0) at operation 230. It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (integrity algorithm for 5G (NIA) or evolved packet system (EPS) integrity algorithm (EIA)) in the stored access stratum (AS) security context, which was negotiated between the UE and the last serving gNB, and the $K_{RRCint}$ from the stored AS security context with the following inputs:

KEY: it shall be set to current $K_{RRCint}$;
  BEARER: all its bits shall be set to 1;
  DIRECTION: its bit shall be set to 1;
  COUNT: all its bits shall be set to 1; and
  MESSAGE: it shall be set to VarResumeMAC-Input with following inputs:
  source PCI (set to the physical cell identity of the PCell the UE was connected to prior to suspension of the RRC connection);
  target Cell-ID (set to the cellIdentity of the first PLMN-Identity included in the PLMN-IdentityInfoList broadcasted in SIB1 of the target cell, i.e., the cell to which the UE is sending small data); and
  source C-RNTI (set to C-RNTI that the UE had in the PCell it was connected to prior to suspension of the RRC connection).

In an embodiment, ResumeMAC-I can be generated using the enhanced resume protection methods explained earlier in this disclosure.

The UE resumes SRB(s) and data radio bearer(s) (DRB(s)), derives new security keys using the NextHopChainingCount provided in the RRCRelease message of the previous RRC connection, and re-establishes the AS security. The user data are ciphered and integrity protected (only for DRBs configured with user plane (UP) integrity protection) and transmitted on dedicated traffic channels (DTCH) multiplexed with the RRCResumeRequest/RRCResumeRequest1 message on common control channel (CCCH)/CCCH1.

gNB validates the resumeMAC-I and delivers the uplink data to user plane function (UPF) at operation 240.

The gNB sends the RRCRelease message to keep the UE in RRC_INACTIVE at operation 260. PDCCH is addressed to temporary cell-RNTI (TC-RNTI). If downlink data received from the UPF at operation 250 are available, they are sent ciphered and integrity protected (only for DRBs configured with UP integrity protection) on DTCH multiplexed with the RRCRelease message on DCCH at operation 260.

In case of central unit (CU) distributed unit (DU) split architecture in gNB, CU comprises gNB-CU-CP and gNB-CU-UP. DU interacts with gNB-CU-CP over F1-C interface. DU interacts with gNB-CU-UP over F1-U interface. gNB-CU-CP interacts with gNB-CU-UP over E1-C interface.

DU receives the RRCResumeRequest/RRCResumeRequest1 message and uplink data from UE. DU sends F1 Initial UL RRC Message Transfer message to the gNB-CU-CP. F1 Initial UL RRC Message Transfer message includes RRCResumeRequest/RRCResumeRequest1 received from UE.

In an embodiment, upon determining that UE has initiated small data transmission (determination can be done based on received RA preamble or based on presence of dedicated control channel (DCCH)/DTCH MAC service data unit (SDU) in Msg3. Note that RA preamble/ROs for SDT are different from RA for other purposes), DU also includes uplink data in Initial UL RRC Message Transfer message. gNB-CU-CP performs the validation of resumeMAC-I and if validation is successful, it sends the uplink data to gNB-CU-UP over E1 interface. gNB-CU-UP processes the uplink data and sends the processed data to UPF.

In another embodiment, DU does not include uplink data in Initial UL RRC Message Transfer message. It indicates that UE has initiated resume for small data transmission or UE has initiated small data transmission. DU can identify that UE has initiated resume for small data transmission based on received RA preamble or based on presence of DCCH/DTCH MAC SDU in Msg3. Note that RA preamble/ROs for SDT are different from RA for other purposes. It may also include F1 downlink (DL) tunnel endpoint identifiers (TEIDs) allocated for the DRBs. gNB-CU-CP performs the validation of resumeMAC-I and if validation is successful, it sends F1 UE Context Setup Request message including the stored F1 UL TEIDs to create the UE context in the gNB-DU; the gNB-CU-CP also sends E1 Bearer Context Modification Request with a RRC Resume indication (or indicating resume for small data transmission) and F1 DL TEIDs received from DU. Upon receiving context setup request from gNB-CU-CP, DU sends uplink data to gNB-CU-UP over F1-U interface.

Figure 3:
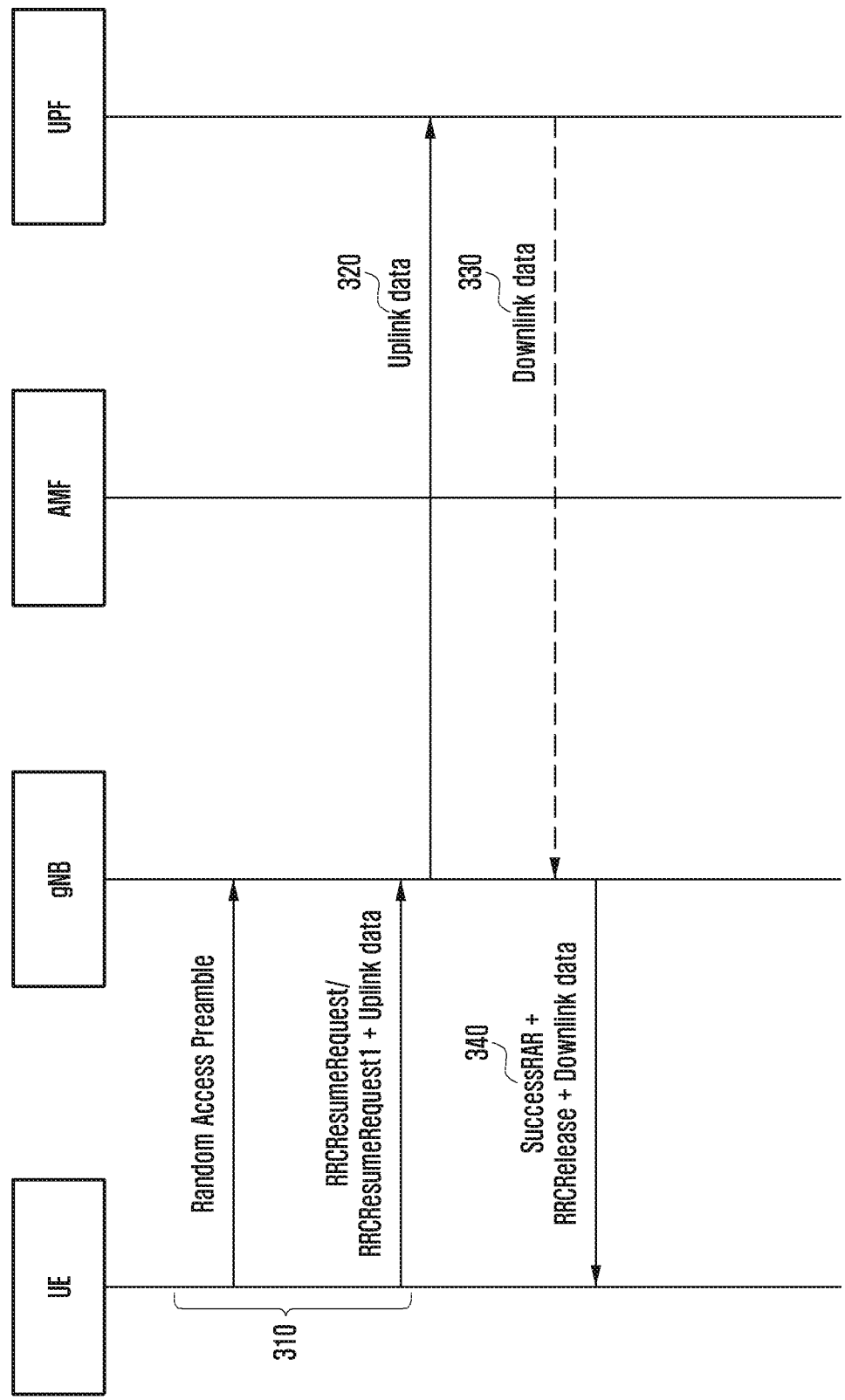
FIG. 3 shows the signaling flow for small data transmission using 2-step RA according to an embodiment of the disclosure.

FIG. 3 shows the signaling flow for small data transmission using 2-step RA according to an embodiment of the disclosure.

If criteria to initiate 2-step RA for SDT are met, UE selects preamble/RO/paging occasion (PO) from preambles/ROs/POs for SDT. UE transmits a MSGA including a random access preamble at operation 310.

In the MSGA payload, the UE sends an RRCResumeRequest/RRCResumeRequest1 and uplink data to the gNB (same as the last serving gNB) on SRB0 at operation 320. It includes full/short I-RNTI (resumeIdentity), the resume cause (resumeCause), and an authentication token (resumeMAC-I). The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA or EIA) in the stored AS security context, which was negotiated between the UE and the last serving gNB, and the $K_{RRCint}$ from the stored AS security context with the following inputs:

KEY: it shall be set to current $K_{RRCint}$,
BEARER: all its bits shall be set to 1;
DIRECTION: its bit shall be set to 1;
COUNT: all its bits shall be set to 1; and
MESSAGE: it shall be set to VarResumeMAC-Input with following inputs:
source PCI (set to the physical cell identity of the PCell the UE was connected to prior to suspension of the RRC connection);
target Cell-ID (set to the cellIdentity of the first PLMN-Identity included in the PLMN-IdentityInfoList broadcasted in SIB1 of the target cell, i.e., the cell to which the UE is sending small data); and
source C-RNTI (set to C-RNTI that the UE had in the PCell it was connected to prior to suspension of the RRC connection).

In an embodiment, ResumeMAC-I can be generated using the enhanced resume protection methods explained earlier in this disclosure.

The UE resumes all SRBs and DRBs, derives new security keys using the NextHopChainingCount provided in the RRCRelease message of the previous RRC connection, and re-establishes the AS security. The user data are ciphered and integrity protected (only for DRBs configured with UP integrity protection) and transmitted on DTCH multiplexed with the RRCResumeRequest/RRCResumeRequest1 message on CCCH/CCCH1.

gNB validates the resumeMAC-I and delivers the uplink data to UPF at operation 330.

The gNB sends the RRCRelease message to keep the UE in RRC_INACTIVE in MsgB along with successRAR at operation 350. PDCCH is addressed to C-RNTI. If downlink data received from the UPF at operation 340 are available, they are sent ciphered and integrity protected (Only for DRBs configured with UP integrity protection) on DTCH multiplexed with the RRCRelease message on DCCH at operation 350.

In case of CU DU split architecture in gNB, CU comprises gNB-CU-CP and gNB-CU-UP. DU interacts with gNB-CU-CP over F1-C interface. DU interacts with gNB-CU-UP over F1-U interface. gNB-CU-CP interacts with gNB-CU-UP over E1-C interface.

DU receives the RRCResumeRequest/RRCResumeRequest1 message and uplink data from UE. DU sends F1 Initial UL RRC Message Transfer message to the gNB-CU-CP. F1 Initial UL RRC Message Transfer message includes RRCResumeRequest/RRCResumeRequest1 received from UE.

In an embodiment, upon determining that UE has initiated small data transmission (determination can be done based on received RA preamble or based on presence of DCCH/DTCH MAC SDU in MSGA. Note that RA preamble/ROs for SDT are different from RA for other purposes), DU also includes uplink data in Initial UL RRC Message Transfer message. gNB-CU-CP performs the validation of resume-MAC-I and if validation is successful, it sends the uplink data to gNB-CU-UP over E1 interface. gNB-CU-UP processes the uplink data and sends the processed data to UPF.

In another embodiment, DU does not include uplink data in Initial UL RRC Message Transfer message. It indicates that UE has initiated resume for small data transmission or UE has initiated small data transmission. DU can identify that UE has initiated resume for small data transmission based on received RA preamble or based on presence of DCCH/DTCH MAC SDU in MSGA. Note that RA preamble/ROs for SDT are different from RA for other purposes. It may also include F1 DL TEIDs allocated for the DRBs. gNB-CU-CP performs the validation of resume-MAC-I and if validation is successful, it sends F1 UE Context Setup Request message including the stored F1 UL TEIDs to create the UE context in the gNB-DU; the gNB-CU-CP also sends E1 Bearer Context Modification Request with a RRC Resume indication (or indicating resume for small data transmission) and F1 DL TEIDs received from DU. Upon receiving context setup request from gNB-CU-CP, DU sends uplink data to gNB-CU-UP over F1-U interface.

Preamble and random access channel (RACH) occasions (ROs) for small data transmission ROs for Small Data Transmission Using 4-Step Random Access (RA)

ROs for small data transmission are not shared with 4-step ROs for other purposes. However, ROs for small data transmission (SDT) using 4-step RA can be shared with ROs for small data transmission using 2-step RA. Following parameters are signaled (in system information or dedicated RRC signaling, e.g., reconfiguration message) by gNB for configuring ROs for small data transmission using 4-step RA.

prach-ConfigurationIndex-SDT refers to a physical RACH (PRACH) configuration index for SDT using 4-step RA. The gNB has the option to not signal prachConfigurationIndex-SDT. If prach-ConfigurationIndex-SDT is not signaled by gNB, UE may determine PRACH occasions for SDT according to msgAPRACH-ConfigurationIndex-SDT (PRACH configuration index for SDT using 2-step RA) configured/signaled by gNB for SDT using 2-step RA (i.e., in RACH-ConfigGenericTwoStepRA for SDT).

msg1-FDM-SDT refers to the number of message 1 (Msg1) PRACH transmission occasions Frequency-Division Multiplexed in one time instance for small data transmission. If the field is absent, UE shall use value of msgA-RO-FDM-SDT in RACH-ConfigGenericTwoStepRA for SDT.

msg1-FrequencyStart-SDT refers to an offset of lowest PRACH transmissions occasion in frequency domain with respect to physical resource block (PRB) 0. If the field is absent, UE shall use value of msgA-RO-FrequencyStart for SDT in RACH-ConfigGenericTwoStepRA for SDT.

For flexible signaling of ROs for SDT, following parameters can be configured in RACH configuration for 4-step RA based SDT.

--- prach-ConfigurationPeriodScaling-SDT
Scaling factor to extend the periodicity of the baseline configuration indicated by prach-ConfigurationIndex-SDT.
Value scf1 correponds to scaling factor of 1 and so on.
prach-ConfigurationFrameOffset-SDT
Scaling factor for ROs defined in the baseline configuration indicated by prach-ConfigurationIndex-SDT.
prach-ConfigurationSOffset-SDT
Subframe/Slot offset for ROs defined in the baseline configuration indicated by prach-ConfigurationIndex-SDT.

---

Upon initiation of 4-step RA for small data transmission, UE selects RO from ROs determined according to the above parameters.

RA Preambles for SDT Using 4-Step RA

Following options are supported for determining preambles for SDT using 4 step RA.

ssb-perRACH-Occasion-SDT (N1) is configured for SDT using 4-step RA.

CB-PreamblesPerSSB-SDT (X) is configured for SDT using 4-step RA.

The preambles for SDT using 4-step RA are determined as follows.

If N1<1, one synchronization signal (SS)/physical broadcast channel (PBCH) block (SSB) is mapped to 1/N1 consecutive valid PRACH occasions and X contention based preambles with consecutive indexes associated with the SS/PBCH block per valid PRACH occasion start from preamble index 0. If N1≥1, X contention based preambles with consecutive indexes associated with SS/PBCH block n, 0≤n≤N1−1, per valid PRACH occasion start from preamble index $n*N_{preamble}^{total}/N1$, where $N_{preamble}^{total}$ is provided by totalNumberOfRA-Preambles for random access procedure preamble for SDT.

Alternately:

CB-PreamblesPerSSB-SDT (X) is configured for SDT using 4-step RA.

ssb-perRACH-Occasion-SDT (N1) is configured for 4-step RA.

Starting preamble index (S) for SDT using 4-step RA is configured.

If N1<1, one SS/PBCH block is mapped to 1/N1 consecutive valid PRACH occasions and X contention based preambles with consecutive indexes associated with the SS/PBCH block per valid PRACH occasion start from preamble index S. If N1≥1, X contention based preambles with consecutive indexes associated with SS/PBCH block n, 0≤n≤N1−1, per valid PRACH occasion start from preamble index $n·N_{preamble}^{total}/N1+S$, where $N_{preamble}^{total}$ is provided by totalNumberOfRA-Preambles for random access procedure for SDT.

Upon initiation of 4-step RA for small data transmission, UE selects preamble from preambles determined according to the above parameters.

The RACH parameters for small data transmission using 4-step RA are configured for initial uplink (UL) bandwidth part (BWP) (separately for normal uplink (NUL) and supplementary uplink (SUL)). If any other UL BWP is used for SDT, RACH parameters for small data transmission using 4-step RA can also be configured for those UL BWPs as well. If multiple preamble groups are supported for small data transmission using 4-step RA, information to determine number of preambles per group is also configured in the RACH parameters for small data transmission using 4-step RA. Other parameters such as random access response (RAR) window, power ramping step, received target power, etc. can also be configured in the RACH parameters for small data transmission using 4-step RA and if not configured, UE applies the corresponding parameters from RACH configuration for small data transmission using 2-step RA. Separate BWP for SDT can be configured. As initial BWP could be narrow while SDT may requires wider bandwidth (BW). Alternately, UL grant in RAR can indicate resource blocks (RBs) outside initial BWP.

ROs for SDT Using 2-Step RA

ROs for small data transmission using 2-step RA are not shared with 2-step ROs for other purposes. However, ROs for small data transmission (SDT) using 2-step RA can be shared with ROs for small data transmission using 4-step RA. Following parameters are signaled (in system information or dedicated RRC signaling, e.g., reconfiguration message) by gNB for configuring ROs for small data transmission using 2-step RA.

msgA-PRACH-ConfigurationIndex-SDT refers to a PRACH configuration index for SDT using 2-step RA. The gNB has the option to not signal msgAPRACH-ConfigurationIndex-SDT. If msgA-PRACH-ConfigurationIndex-SDT is not signaled by gNB, UE may determine PRACH occasions for 2-step RA based SDT according to prach-ConfigurationIndex configured/signaled by gNB for SDT using 4-step RA.

msgA-RO-FDM-SDT refers to the number of message A (MSGA) PRACH transmission occasions Frequency-Division Multiplexed in one time instance for SDT using 2-step RA. If the field is absent, UE shall use value of msg1-RO-FDM configured/signaled by gNB for SDT using 4-step RA.

msgA-RO-FrequencyStart-SDT refers to an offset of lowest PRACH transmissions occasion in frequency domain with respect to PRB 0. If the field is absent, UE shall use value of msg1-FrequencyStart configured/signaled by gNB for SDT using 4-step RA.

For flexible signaling of ROs for SDT, following parameters can be configured in RACH configuration for SDT using 2-step RA.

--- prach-ConfigurationPeriodScaling-SDT
Scaling factor to extend the periodicity of the baseline configuration indicated by prach-ConfigurationIndex.
Value scf1 correponds to scaling factor of 1 and so on.
prach-ConfigurationFrameOffset-SDT
Scaling factor for ROs defined in the baseline configuration indicated by prach-ConfigurationIndex.
prach-ConfigurationSOffset-SDT
Subframe/Slot offset for ROs defined in the baseline configuration indicated by prach-ConfigurationIndex.

---

Upon initiation of 2-step RA for small data transmission, UE selects RO from ROs determined according to the above parameters.

RA Preambles for SDT Using 2-Step RA

Following options are supported for determining preambles for SDT.

Option 1: 2-step ROs used for SDT using 2-step RA are same as 4-step ROs for SDT using 4-step RA.

ssb-perRACH-Occasion (N1) is configured for SDT using 4-step RA.

CB-PreamblesPerSSB (R1) is configured for SDT using 4-step RA.

CB-PreamblesPerSSB-SDT (X) is configured for SDT using 2-step RA.

If N1<1, one SS/PBCH block is mapped to 1/N1 consecutive valid PRACH occasions and X contention based preambles with consecutive indexes associated with the SS/PBCH block per valid PRACH occasion start from preamble index R1. If N1≥1, X contention based preambles with consecutive indexes associated with SS/PBCH block n, 0≤n≤N1−1, per valid PRACH occasion start from preamble index $n·N_{preamble}^{total}/N1+R1$, where $N_{preamble}^{total}$ is provided by totalNumberOfRA-Preambles for random access procedure for SDT. If totalNumberOfRA-Preambles is not configured, UE assumes the value is 64.

Alternately:

CB-PreamblesPerSSB-SDT (X) is configured for SDT using 2-step RA.

ssb-perRACH-Occasion (N1) is configured for SDT using 4-step RA.

Starting preamble index (S) for SDT using 2-step RA is configured.

If N1<1, one SS/PBCH block is mapped to 1/N1 consecutive valid PRACH occasions and X contention based preambles with consecutive indexes associated with the SS/PBCH block per valid PRACH occasion start from preamble index S. If N1≥1, X contention based preambles with consecutive indexes associated with SS/PBCH block n, 0≤n≤N1−1, per valid PRACH occasion start from preamble index $n \cdot N_{preamble}^{total}/N1+S$, where $N_{preamble}^{total}$ is provided by totalNumberOfRA-Preambles for 2-step random access procedure.

Option 2: ROs used for SDT using 2-step RA are different from ROs for SDT using 4-step RA.

CB-PreamblesPerSSB-SDT (X) is configured for SDT using 2-step RA ssb-perRACH-Occasion-SDT (Y) is configured for SDT using 2-step RA If Y<1, one SS/PBCH block is mapped to 1/Y consecutive valid PRACH occasions and X contention based preambles with consecutive indexes associated with the SS/PBCH block per valid PRACH occasion start from preamble index 0. If Y≥1, X contention based preambles with consecutive indexes associated with SS/PBCH block n, $0 \leq n \leq Y-1$, per valid PRACH occasion start from preamble index $n \cdot N_{preamble}^{total}/Y$, where $N_{preamble}^{total}$ is provided by total-NumberOfRA-Preambles for SDT 2-step random access procedure. If totalNumberOfRA-Preambles for SDT 2-step random access procedure is not configured, UE assumes the value is 64.

Simple option to cover both shared (option 1) and non-shared (option 2)

Starting preamble index (S) for SDT using 2-step RA is configured.

CB-PreamblesPerSSB-SDT (X) is configured for SDT using 2-step RA.

ssb-perRACH-Occasion-SDT (Y) is configured for SDT using 2-step RA.

If Y<1, one SS/PBCH block is mapped to 1/Y consecutive valid PRACH occasions and X contention based preambles with consecutive indexes associated with the SS/PBCH block per valid PRACH occasion start from preamble index S. If Y≥1, X contention based preambles with consecutive indexes associated with SS/PBCH block n, $0 \leq n \leq Y-1$, per valid PRACH occasion start from preamble index $n \cdot N_{preamble}^{total}/Y+S$, where $N_{preamble}^{total}$ is provided by totalNumberOfRA-Preambles for SDT 2-step random access procedure. If totalNumberOfRA-Preambles for SDT 2-step random access procedure is not configured, UE assumes the value is 64.

Upon initiation of 2-step RA for small data transmission, UE selects preamble from preambles determined according to the above parameters.

The RACH parameters for small data transmission using 2-step RA are configured for initial UL BWP (separately for NUL and SUL). If any other UL BWP is used for SDT, RACH parameters for small data transmission using 2-step RA can also be configured for those UL BWPs as well. If multiple preamble groups are supported for small data transmission, information to determine number of preambles per group is also configured in the RACH parameters for small data transmission using 2-step RA. Other parameters such as message B (MSGB) window, power ramping step, received target power, etc. can also be configured in the RACH parameters for small data transmission using 2-step RA and if not configured, UE applies the corresponding parameters from RACH-ConfigGenericTwoStepRA for 4-step RA.

Separate BWP for SDT can be configured. As initial BWP could be narrow while SDT may requires wider BW. Alternately, UL grant in RAR can indicate RBs outside initial BWP.

Enhanced 4-Step RA Procedure for Small Data Transmission

In the current method of small data transmission using 4-step RA, uplink data is transmitted in Msg3. This require configuration of different RACH preambles and/or RACH occasions for small data transmissions. The uplink transmission is also not contention free which leads to waste of physical uplink shared channel (PUSCH) resources in case of collision. So, enhanced method is needed.

Figure 4:
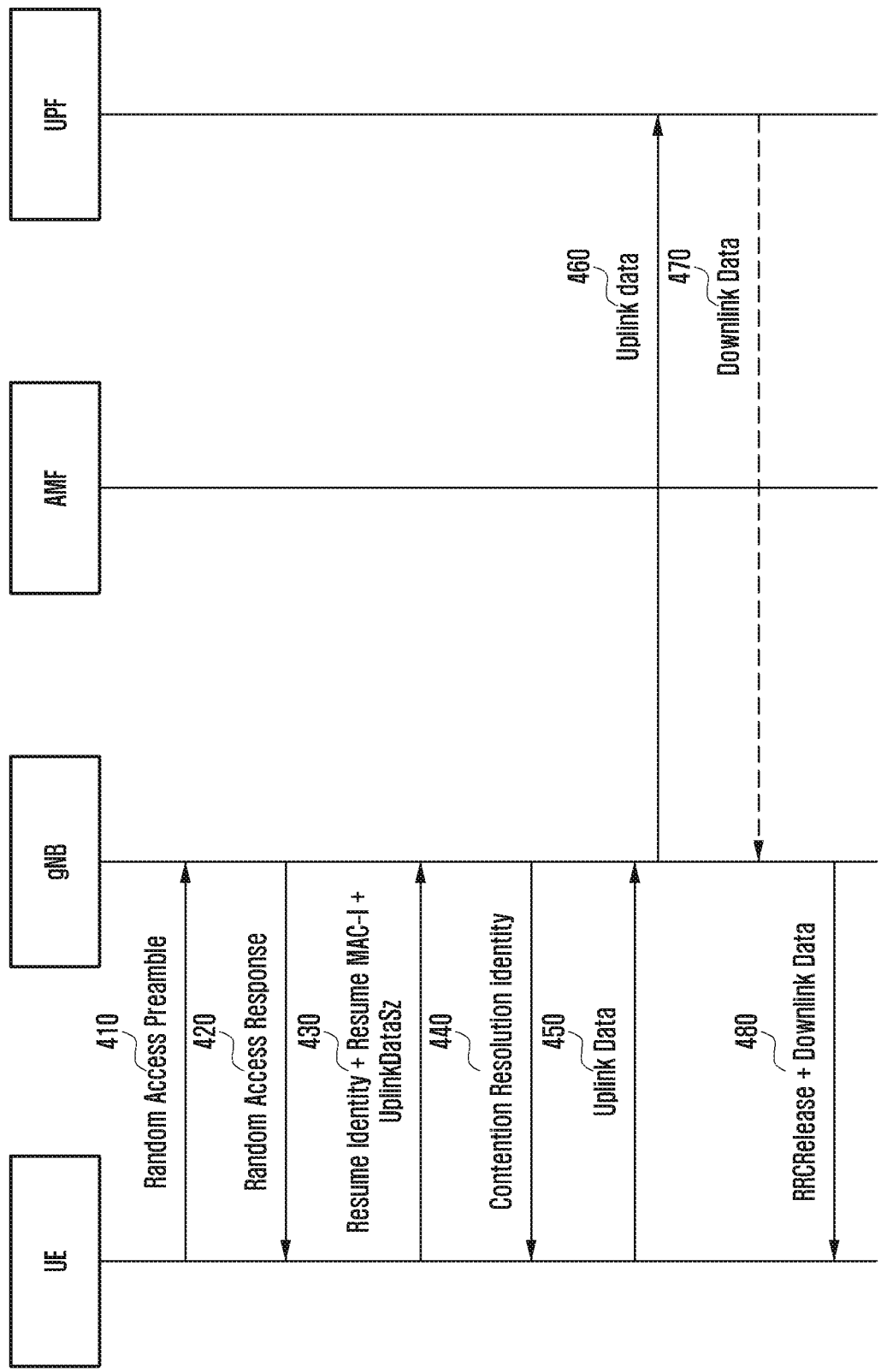
FIG. 4 shows the signaling flow for small data transmission using 4-step RA according to an embodiment of the disclosure.

FIG. 4 illustrates an enhanced 4-step RA procedure for SDT according to an embodiment of the disclosure.

In this procedure, Msg3 MAC PDU includes Resume Identity, ResumeMAC-I, and Uplink data size (e.g., MAC PDU size including MAC service data unit(s) (SDU(s)) from dedicated traffic channels (DTCHs)/DCCHs or information on the buffer size in DRBs/dedicated DTCHs). Uplink data is not transmitted in Msg3. Uplink data is transmitted after contention resolution (i.e., reception of contention resolution identity). The UL grant for Uplink data can be provided along with contention resolution identity message, or alternately it can be provided by physical downlink control channel (PDCCH) addressed to C-RNTI after contention resolution. Note that in an embodiment, UL data size may not be included in Msg3 and UE can select preamble from one of the preambles group wherein each preamble group corresponds to different MAC PDU (or uplink data)size.

Following options are supported for transmitting {Resume Identity, ResumeMAC-I, Uplink data size} in Msg3 payload.

Option 1: New RRC messages are defined: RCResumeRequestSDT/RRCResumeRequestSDT1.

RRCResumeRequestSDT/RRCResumeRequestSDT1 includes Resume Identity, ResumeMAC-I, and Uplink data size. No resume cause. ResumeMAC-I can be generated in same manner as generated in case of RRCResumeRequest/RRCResumeRequest1.

Option 2: RRCResumeRequest/RRCResumeRequest1 are used with modification.

Spare bit indicates resume is for small data transmission.
Resume cause code points indicates Uplink data size.

Option 3: RRCResumeRequest/RRCResumeRequest1 includes Resume Identity, ResumeMAC-I, and Resume cause.

Uplink data size is included in a MAC control element (CE). One example of MAC CE can be BSR MAC CE wherein buffer size of one or more logical channels (LCHs) or logical channel groups (LCGs) associated with DRBs/SRBs for which SDT is allowed is included.

Note that upon initiation of small data transmission using the above approach, buffer status report (BSR) is not triggered in MAC. In other words, BSR is not included in Msg3. In another embodiment, for Msg3 and MSGA MAC PDU of a RA initiated for small data transmission, short BSR is triggered/included. The BSR can be determined as follows:

For Regular and Periodic BSR, the MAC entity shall:
1> If more than one logical channel group (LCG) has data available for transmission when the MAC PDU containing the BSR is to be built; and when the MAC PDU to be built is not Msg3 or MSGA for small data transmission:
2> report Long BSR for all LCGs which have data available for transmission.
1> Else:
2> report Short BSR.

FIG. 4 shows the signaling flow for small data transmission using 4-step RA according to an embodiment of the disclosure. In this case, it is assumed the gNB has the UE's context.

1. If criteria to initiate 4-step RA for SDT are met, UE selects SSB and then preamble/RO for selected SSB. UE transmits random access preamble at operation 410, and receives RAR including UL grant for Msg3 transmission at operation 420. For RAR, UE monitors PDCCH addressed to RA-RNTI in RAR search space. The RA-RNTI is calculated as follows: RA-RNTI=1+ s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e., RA preamble (0≤s_id<14); t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

2. In the Msg3 payload, the UE sends full/short I-RNTI (resumeIdentity), ResumeMAC-I, and Uplink data size included in RRC message/MAC CE as explained above to the gNB (same as the last serving gNB) on SRB 0 at operation 430. The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token. The UE shall calculate it using the integrity algorithm (integrity algorithm for 5G (NIA) or evolved packet system (EPS) integrity algorithm (EIA)) in the stored access stratum (AS) security context, which was negotiated between the UE and the last serving gNB, and the $K_{RRCint}$ from the stored AS security context with the following inputs:

KEY: it shall be set to current $K_{RRCint}$;
BEARER: all its bits shall be set to 1;
DIRECTION: its bit shall be set to 1;
COUNT: all its bits shall be set to 1; and
MESSAGE: it shall be set to VarResumeMAC-Input with following inputs:
source PCI (set to the physical cell identity of the PCell the UE was connected to prior to suspension of the RRC connection);
target Cell-ID (set to the cellIdentity of the first PLMN-Identity included in the PLMN-IdentityInfoList broadcasted in SIB1 of the target cell, i.e., the cell to which the UE is sending small data); and
source C-RNTI (set to C-RNTI that the UE had in the PCell it was connected to prior to suspension of the RRC connection).

Note that resumeCause and/or I-RNTI may also be included in MESSAGE. In an embodiment, ResumeMAC-I can be generated using the enhanced resume protection methods explained earlier in this disclosure.

The UE resumes signaling radio bearer(s) (SRB(s)) and data radio bearer(s) (DRB(s)), derives new security keys using the NextHopChainingCount provided in the RRCRelease message of the previous RRC connection and re-establishes the AS security. The user data are ciphered and integrity protected (only for DRBs configured with user plain (UP) integrity protection).

3. gNB validates the resumeMAC-I. Upon validation gNB sends Msg4 including contention resolution identity at operation 440.
4. Upon receiving contention resolution identity which matches the common control channel (CCCH) SDU transmitted in Msg3, RA procedure is considered completed. UE monitors PDCCH addressed to C-RNTI received in RAR.
5. UE transmits Uplink data in received UL grant at operation 450. Uplink data is sent by gNB to user plane function (UPF) at operation 460.
6. The gNB sends the RRCRelease message to keep the UE in RRC_INACTIVE at operation 480. The PDCCH scheduling downlink (DL) transport block (TB) carrying RRCRelease message is addressed to C-RNTI. If downlink data from the UPF is available at operation 470, they are sent ciphered and integrity protected (Only for DRBs configured with UP integrity protection) on DTCH multiplexed with the RRCRelease message on dedicated control channel (DCCH) at operation 480. It is also possible to first send downlink data to UE and then RRCRelease message but this will increase latency and PDCCH overhead.

Figure 5:
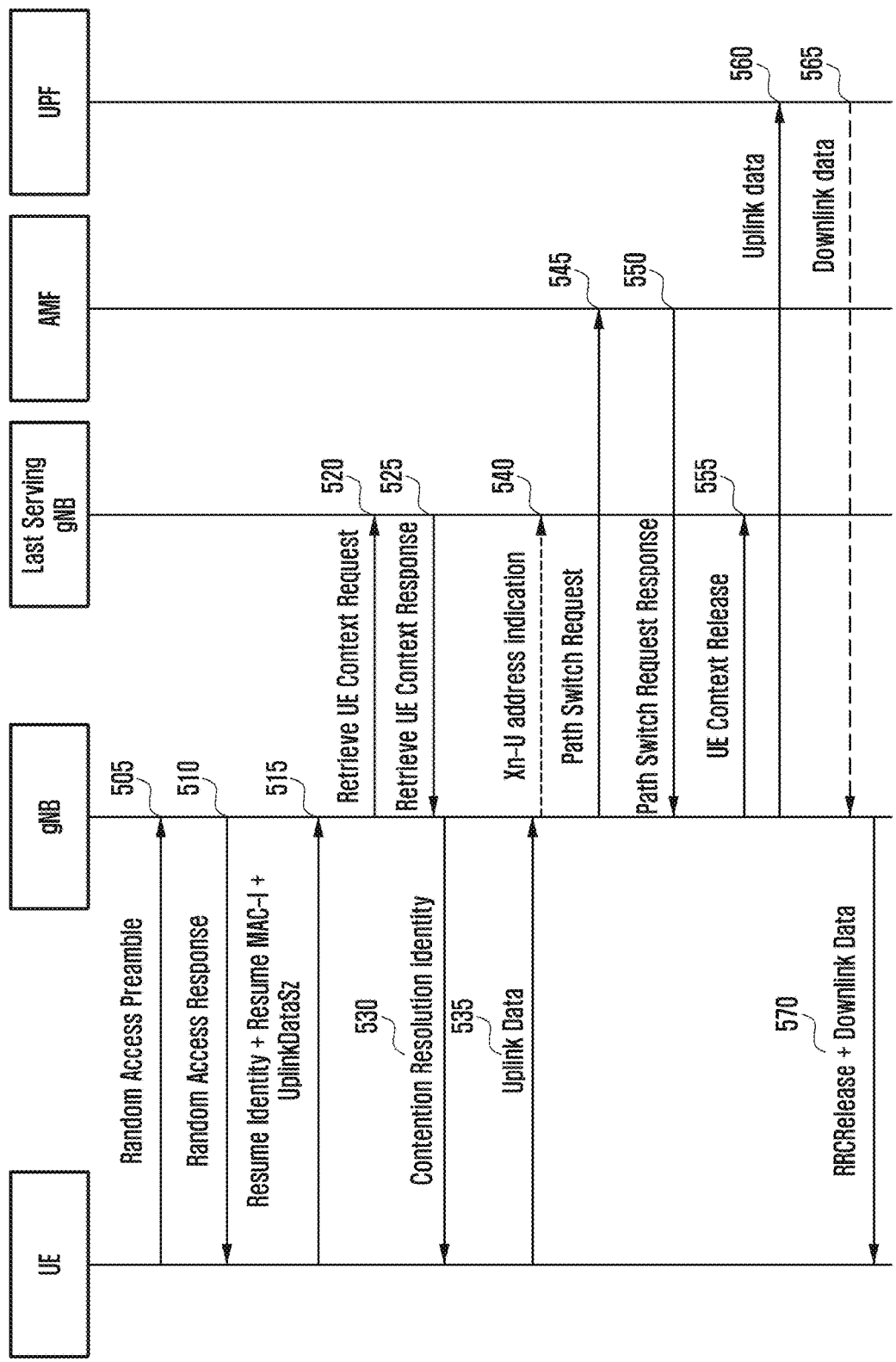
FIG. 5 shows the signaling flow for small data transmission using 4-step RA according to another embodiment of the disclosure.

FIG. 5 shows the signaling flow for small data transmission using 4-step RA according to another embodiment of the disclosure. In this case, it is assumed the gNB does not have the UE's context and fetches the same from last serving gNB. Path switch is performed and context is released from last serving gNB.

1. If criteria to initiate 4-step RA for SDT are met, UE selects SSB and then preamble/RO for selected SSB. UE transmits random access preamble at operation 505, and receives RAR including UL grant for Msg3 transmission at operation 510. For RAR, UE monitors PDCCH addressed to RA-RNTI in RAR search space. The RA-RNTI is calculated as follows: RA-RNTI=1+ s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e., RA preamble (0≤s_id<14); t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

2. In the Msg3 payload, the UE sends full/short I-RNTI (resumeIdentity), ResumeMAC-I, and Uplink data size included in RRC message/MAC CE as explained above to the gNB (same as the last serving gNB) on SRB 0 at operation 515. The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token. The UE shall calculate it using the integrity algorithm (NIA or EIA) in the stored AS security context, which was negotiated between the UE and the last serving gNB, and the $K_{RRCint}$ from the stored AS security context with the following inputs:

KEY: it shall be set to current $K_{RRCint}$;
BEARER: all its bits shall be set to 1;
DIRECTION: its bit shall be set to 1;
COUNT: all its bits shall be set to 1; and
MESSAGE: it shall be set to VarResumeMAC-Input with following inputs:
source PCI (set to the physical cell identity of the PCell the UE was connected to prior to suspension of the RRC connection);
target Cell-ID (set to the cellIdentity of the first PLMN-Identity included in the PLMN-IdentityInfoList broadcasted in SIB1 of the target cell, i.e., the cell to which the UE is sending small data); and source C-RNTI (set to C-RNTI that the UE had in the PCell it was connected to prior to suspension of the RRC connection).

Note that resumeCause and/or I-RNTI may also be included in MESSAGE. In an embodiment, ResumeMAC-I can be generated using the enhanced resume protection methods explained earlier in this disclosure.

The UE resumes SRB(s) and DRB(s), derives new security keys using the NextHopChainingCount provided in the RRCRelease message of the previous RRC connection and re-establishes the AS security. The user data are ciphered and integrity protected (Only for DRBs configured with UP integrity protection).

3. gNB (i.e., target gNB) identifies the gNB identity of last serving gNB (i.e, source gNB) from I-RNTI and requests it to provide the UE's context data by sending a Retrieve UE Context Request message at operation 520, with the following included: I-RNTI, the Resume-MAC-I and target Cell-ID, in order to allow the source gNB to validate the UE request and to retrieve the UE context. In an embodiment, the operation to validate the UE request can be as defined in enhanced resume protection methods explained earlier in this disclosure.

4. The last serving gNB (i.e., source gNB) validates the resumeMAC-I and provides the UE context data. The source gNB retrieves the stored UE context including the UE 5G AS security context from its database using the I-RNTI. The source gNB verifies the Resume-MAC-I using the current $K_{RRCint}$ key stored in the retrieved UE 5G AS security context (calculating the ResumeMAC-I in the same way as described above). If the verification of the ResumeMAC-I is successful (in an embodiment, the operation to validate Resume-MAC-I can be as defined in enhanced resume protection methods explained earlier in this disclosure), then the source gNB calculates $K_{NG\_RAN}^*$ using the target cell PCI, target absolute radio-frequency channel number (ARFCN)-DL and the $K_{gNB}$/next hop (NH) in the current UE 5G AS security context based on either a horizontal key derivation or a vertical key derivation according to whether the source gNB has an unused pair of {NCC, NH}. The parameter 'NCC' refers to a next hop chaining counter parameter. The source gNB can obtain the target PCI and target ARFCN-DL from a cell configuration database by means of the target Cell-ID which was received from the target gNB. Then the source gNB shall respond with an Xn-application protocol (AP) Retrieve UE Context Response message to the target gNB including the UE context that contains the UE 5G AS security context at operation 525. The UE 5G AS security context sent to the target gNB shall include the newly derived $K_{NG\_RAN}^*$, the NCC associated to the $K_{NG\_RAN}^*$, the UE 5G security capabilities, UP security policy, the UP security activation status with the corresponding PDU session ID(s), and the ciphering and integrity algorithms used by the UE with the source cell.

5. Upon recovering context from last serving gNB, gNB sends Msg4 including contention resolution identity at operation 530. gNB may include UL grant in Msg4 or after Msg4. gNB sends a PDCCH addressed to C-RNTI scheduling UL grant for uplink data transmission.

6. Upon receiving contention resolution identity which matches the CCCH SDU transmitted in Msg3, RA procedure is considered completed. UE monitors PDCCH addressed to C-RNTI received in RAR.

7. UE transmits Uplink data in received UL grant at operation 535. Uplink data is sent by gNB to UPF at operation 560.

8. If loss of DL user data buffered in the last serving gNB shall be prevented, the gNB provides forwarding addresses (i.e., Xn-U address indication) at operation 540.

9. The gNB performs path switch. The gNB (i.e., target gNB) transmits a path switch request message to AMF at operation 545, and receives a path switch request response message from AMF at operation 550.

10. The gNB triggers the release of the UE resources at the last serving gNB by transmitting a UE context release message at operation 555.

11. gNB delivers the uplink data to UPF at operation 560.

12. The gNB sends the RRCRelease message to keep the UE in RRC_INACTIVE at operation 570. The PDCCH scheduling DL TB carrying RRCRelease message is addressed to C-RNTI. If downlink data from the UPF are available at operation 565, they are sent ciphered and integrity protected (only for DRBs configured with UP integrity protection) on DTCH multiplexed with the RRCRelease message on DCCH at operation 570. It is also possible to first send downlink data to UE and then RRCRelease message but this will increase latency and PDCCH overhead.

The steps 8 to 10 (i.e., operations 540, 545, 550 and 555) can also be performed after step 4 (i.e., operation 525).

In case of CU DU split architecture in gNB, CU comprises gNB-CU-CP and gNB-CU-UP. DU interacts with gNB-CU-CP over F1-C interface. DU interacts with gNB-CU-UP over F1-U interface. gNB-CU-CP interacts with gNB-CU-UP over E1-C interface.

DU receives the RRCResumeRequest/RRCResumeRequest1 message and uplink data from UE as per the enhanced small data transmission procedure explained above. DU sends F1 Initial UL RRC Message Transfer message to the gNB-CU-CP. F1 Initial UL RRC Message Transfer message includes RRCResumeRequest/RRCResumeRequest1 received from UE.

In an embodiment, it indicates that UE has initiated resume for small data transmission or UE has initiated small data transmission. DU can identify that UE has initiated resume for small data transmission based on received RA preamble or based on presence of BSR MAC CE or uplink data size information in MSGA/Msg3. Note that RA preamble/ROs for SDT are different from RA for other purposes. It may also include F1 DL TEIDs allocated for the DRBs. gNB-CU-CP performs the validation of resume-MAC-I (as explained earlier) and if validation is successful, it sends F1 UE Context Setup Request message including the stored F1 UL TEIDs to create the UE context in the gNB-DU; the gNB-CU-CP also sends E1 Bearer Context Modification Request with a RRC Resume indication (or indicating resume for small data transmission) and F1 DL TEIDs received from DU. Upon receiving context setup request from gNB-CU-CP, DU sends uplink data received from UE to gNB-CU-UP over F1-U interface.

Figure 6:
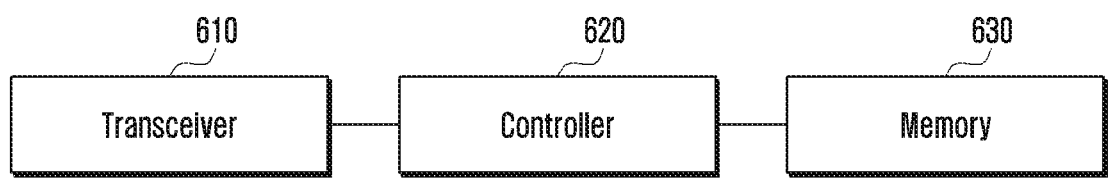
FIG. 6 is a block diagram of a terminal according to an embodiment of the disclosure.

FIG. 6 is a block diagram of a terminal according to an embodiment of the disclosure.

Referring to FIG. 6, a terminal includes a transceiver 610, a controller 620 and a memory 630. The controller 620 may refer to a circuitry, an application-specific integrated circuit (ASIC), a field programmable gate array (FPGA), or at least one processor. The transceiver 610, the controller 620, and the memory 630 are configured to perform the operations of the UE illustrated elsewhere in FIG. 1, or as otherwise described above. Although the transceiver 610, the controller 620, and the memory 630 are shown as separate entities, they may be integrated onto a single chip. The transceiver 610, the controller 620, and the memory 630 may also be electrically connected to or coupled with each other.

The transceiver 610 may transmit and receive signals to and from other network entities, e.g., a base station or another terminal.

The controller 620 may control the UE to perform functions according to the embodiments described above.

In an embodiment, the operations of the terminal may be implemented using the memory 630 storing corresponding program codes. Specifically, the terminal may be equipped with the memory 630 to store program codes implementing desired operations. To perform the desired operations, the controller 620 may read and execute the program codes stored in the memory 630 by using a processor or a central processing unit (CPU).

Figure 7:
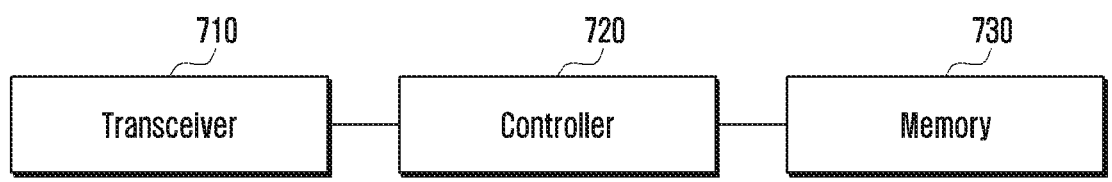
FIG. 7 is a block diagram of a base station according to an embodiment of the disclosure.

FIG. 7 is a block diagram of a base station according to an embodiment of the disclosure.

Referring to FIG. 7, a base station includes a transceiver 710, a controller 720, and a memory 730. The controller 720 may refer to a circuitry, an ASIC, an FPGA, or at least one processor. The transceiver 710, the controller 720, and the memory 730 are configured to perform the operations of the gNB illustrated elsewhere in the figures, or as otherwise described above. Although the transceiver 710, the controller 720, and the memory 730 are shown as separate entities, they may be integrated onto a single chip. The transceiver 710, the controller 720, and the memory 730 may also be electrically connected to or coupled with each other.

The transceiver 710 may transmit and receive signals to and from other network entities, e.g., a terminal.

The controller 720 may control the gNB to perform functions according to the embodiments described above.

In an embodiment, the operations of the base station may be implemented using the memory 730 storing corresponding program codes. Specifically, the base station may be equipped with the memory 730 to store program codes implementing desired operations. To perform the desired operations, the controller 720 may read and execute the program codes stored in the memory 730 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal for small data transmission in a wireless communication system, the method comprising:
   transmitting, to a base station, a random access preamble;
   receiving, from the base station, a random access response corresponding to the random access preamble, wherein the random access response includes an uplink grant for message 3 (Msg3) transmission;
   based on the uplink grant for the Msg3 transmission, transmitting, to the base station, a Msg3 including a resume identity, a resume message authentication code for integrity (MAC-I) and information on an uplink data size;
   in case that the resume MAC-I is validated, receiving, from the base station, a message 4 (Msg4) including a contention resolution identity; and
   transmitting, to the base station, uplink data based on an uplink grant for uplink data transmission,
   wherein the uplink grant for the uplink data transmission is received in the Msg4 or on a physical downlink control channel (PDCCH) addressed to a cell-radio network temporary identifier (C-RNTI), and
   wherein the C-RNTI is received in the random access response and the PDCCH addressed to the C-RNTI is received after the Msg4.

2. The method of claim 1, wherein in case that a media access control (MAC) protocol data unit (PDU) containing a buffer state report (BSR) to be built is the Msg3 for small data transmission, a short BSR is included in the Msg3 for small data transmission.

3. The method of claim 1, further comprising:
   in case that the terminal and a source base station to which the terminal was last connected support enhanced resume protection, generating the resume MAC-I based on a security key and a message including a resume cause.

4. A method performed by a base station for small data transmission in a wireless communication system, the method comprising:
   receiving, from a terminal, a random access preamble;
   transmitting, to the terminal, a random access response corresponding to the random access preamble, wherein the random access response includes an uplink grant for message 3 (Msg3) transmission;
   based on the uplink grant for the Msg3 transmission, receiving, from the terminal, a Msg3 including a resume identity, a resume message authentication code for integrity (MAC-I) and information on an uplink data size;
   validating the resume MAC-I;
   in case that the resume MAC-I is validated, transmitting, to the terminal, a message 4 (Msg4) including a contention resolution identity;
   receiving, from the terminal, uplink data based on an uplink grant for uplink data transmission; and
   transmitting, to a user plane function (UPF), the uplink data,
   wherein the uplink grant for the uplink data transmission is transmitted in the Msg4 or on a physical downlink control channel (PDCCH) addressed to a cell-radio network temporary identifier (C-RNTI), and
   wherein the C-RNTI is transmitted in the random access response and the PDCCH addressed to the C-RNTI is transmitted after the Msg 4.

5. The method of claim 4, wherein the Msg3 for small data transmission includes a short buffer state report (BSR).

6. The method of claim 4, further comprising:
   identifying whether the base station has a context of the terminal;
   in case that the base station does not have the context of the terminal:
      identifying an identity of a source base station to which the terminal was last connected based on the resume identity;
      transmitting, to the source base station, a retrieve request message for the context of the terminal, the retrieve request message including the resume identity, the MAC-I and the identity of the source base station; and
      receiving, from the source base station, a retrieve response message including the context of the terminal.

7. The method of claim 4,
wherein the base station includes a central unit (CU) and at least one distributed unit (DU),
wherein the DU receives the Msg3 and the uplink data from the terminal, and transmits the Msg3 and the uplink data to the CU, and
wherein the CU validates the resume MAC-I, and transmits the uplink data to the UPF.

8. A terminal in a wireless communication system, the terminal comprising:
a transceiver; and
at least one processor coupled with the transceiver and configured to:
  transmit, to a base station via the transceiver, a random access preamble,
  receive, from the base station via the transceiver, a random access response corresponding to the random access preamble, wherein the random access response includes an uplink grant for message 3 (Msg3) transmission,
  based on the uplink grant for the Msg3 transmission, transmit, to the base station via the transceiver, a Msg3 including a resume identity, a resume message authentication code for integrity (MAC-I) and information on an uplink data size,
  in case that the resume MAC-I is validated, receive, from the base station via the transceiver, a message 4 (Msg4) including a contention resolution identity, and
  transmit, to the base station via the transceiver, uplink data based on an uplink grant for uplink data transmission,
wherein the uplink grant for the uplink data transmission is received in the Msg4 or on a physical downlink control channel (PDCCH) addressed to a cell-radio network temporary identifier (C-RNTI), and
wherein the C-RNTI is received in the random access response and the PDCCH addressed to the C-RNTI is received after the Msg4.

9. The terminal of claim 8, wherein in case that a media access control (MAC) protocol data unit (PDU) containing a buffer state report (BSR) to be built is the Msg3 for small data transmission, the at least one processor is further configured to include a short BSR in the Msg3 for small data transmission.

10. The terminal of claim 8, wherein the at least one processor is further configured to:
in case that the terminal and a source base station to which the terminal was last connected support enhanced resume protection, generate the resume MAC-I based on a security key and a message including a resume cause.

11. A base station in a wireless communication system, the base station comprising:
a transceiver; and
at least one processor coupled with the transceiver and configured to:
  receive, from a terminal via the transceiver, a random access preamble,
  transmit, to the terminal via the transceiver, a random access response corresponding to the random access preamble, wherein the random access response includes an uplink grant for message 3 (Msg3) transmission,
  based on the uplink grant for the Msg3 transmission, receive, from the terminal via the transceiver, a Msg3 including a resume identity, a resume message authentication code for integrity (MAC-I) and information on an uplink data size,
  validate the resume MAC-I,
  in case that the resume MAC-I is validated, transmit, to the terminal via the transceiver, a message 4 (Msg4) including a contention resolution identity,
  receive, from the terminal via the transceiver, uplink data based on an uplink grant for uplink data transmission, and
  transmit, to a user plane function (UPF) via the transceiver, the uplink data,
wherein the uplink grant for the uplink data transmission is transmitted in the Msg4 or on a physical downlink control channel (PDCCH) addressed to a cell-radio network temporary identifier (C-RNTI), and
wherein the C-RNTI is transmitted in the random access response and the PDCCH addressed to the C-RNTI is transmitted after the Msg 4.

12. The base station of claim 11, wherein the Msg3 for small data transmission includes a short buffer state report (BSR).

13. The base station of claim 11, wherein the at least one processor is further configured to:
identify whether the base station has a context of the terminal,
in case that the base station does not have the context of the terminal:
  identify an identity of a source base station to which the terminal was last connected based on the resume identity,
  transmit, to the source base station via the transceiver, a retrieve request message for the context of the terminal, the retrieve request message including the resume identity, the MAC-I and the identity of the source base station, and
  receive, from the source base station via the transceiver, a retrieve response message including the context of the terminal.

14. The base station of claim 11,
wherein the base station includes a central unit (CU) and at least one distributed unit (DU), and
wherein the DU receives the Msg3 and the uplink data from the terminal, and transmits the Msg3 and the uplink data to the CU.

15. The base station of claim 11,
wherein the base station includes a central unit (CU) and at least one distributed unit (DU), and
wherein the CU validates the resume MAC-I, and transmits the uplink data to the UPF.

* * * * *